United States Patent
Garner et al.

(10) Patent No.: US 6,801,891 B2
(45) Date of Patent: Oct. 5, 2004

(54) SPEECH PROCESSING SYSTEM

(75) Inventors: Philip Neil Garner, Tokyo (JP); Jason Peter Andrew Charlesworth, Haslemere (GB)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/986,914

(22) Filed: Nov. 13, 2001

(65) Prior Publication Data

US 2002/0120448 A1 Aug. 29, 2002

(30) Foreign Application Priority Data

Nov. 20, 2000 (GB) ............................................. 0028277

(51) Int. Cl.[7] .......................... G10L 15/04; G10L 15/06
(52) U.S. Cl. ...................................... 704/254; 704/243
(58) Field of Search ............................... 704/260, 258, 704/256, 254, 253, 252, 251, 249, 245, 244, 243, 242, 241, 238, 235, 200; 434/185, 169

(56) References Cited

U.S. PATENT DOCUMENTS

| | | | |
|---|---|---|---|
| 4,227,176 A | | 10/1980 | Moshier .............. 340/146.3 R |
| 4,736,429 A | * | 4/1988 | Niyada et al. .............. 704/254 |
| 4,903,305 A | * | 2/1990 | Gillick et al. ............... 704/240 |
| 4,975,959 A | * | 12/1990 | Benbassat ................... 704/240 |
| 4,980,918 A | | 12/1990 | Bahl et al. ..................... 381/43 |
| 4,985,924 A | * | 1/1991 | Matsuura .................... 704/239 |
| 5,075,896 A | * | 12/1991 | Wilcox et al. ............. 382/225 |
| 5,131,043 A | * | 7/1992 | Fujii et al. .................. 704/236 |
| 5,136,655 A | | 8/1992 | Bronson ...................... 381/41 |
| 5,202,952 A | | 4/1993 | Gillick et al. .................. 395/2 |
| 5,333,275 A | * | 7/1994 | Wheatley et al. ........... 704/231 |
| 5,390,278 A | * | 2/1995 | Gupta et al. ............. 379/88.01 |
| 5,500,920 A | | 3/1996 | Kupiec ....................... 395/2.79 |
| 5,577,249 A | | 11/1996 | Califano .................... 395/611 |
| 5,638,425 A | | 6/1997 | Meador, III et al. .......... 379/88 |
| 5,640,487 A | | 6/1997 | Lau et al. ................... 395/2.52 |
| 5,649,060 A | | 7/1997 | Ellozy et al. .............. 395/2.87 |
| 5,675,706 A | | 10/1997 | Lee et al. .................. 395/2.65 |
| 5,680,605 A | | 10/1997 | Torres ........................ 395/603 |
| 5,684,925 A | * | 11/1997 | Morin et al. ................. 704/239 |
| 5,708,759 A | * | 1/1998 | Kemeny ...................... 704/211 |
| 5,721,939 A | | 2/1998 | Kaplan ...................... 395/759 |
| 5,729,741 A | | 3/1998 | Liaguno et al. ............. 395/615 |
| 5,737,489 A | | 4/1998 | Chou et al. ................. 395/2.65 |
| 5,737,723 A | * | 4/1998 | Riley et al. ................. 704/243 |
| 5,752,227 A | * | 5/1998 | Lyberg ....................... 704/231 |

(List continued on next page.)

FOREIGN PATENT DOCUMENTS

| | | |
|---|---|---|
| EP | 0 597 798 A1 | 5/1994 |
| EP | 0 649 144 A1 | 4/1995 |
| EP | 0 649 144 B1 | 4/1995 |
| EP | 0 689 153 A2 | 12/1995 |
| EP | 0 789 349 A2 | 8/1997 |
| EP | 0 849 723 A2 | 6/1998 |
| GB | 2 302 199 A | 1/1997 |

(List continued on next page.)

OTHER PUBLICATIONS

"Classic Maximum Entropy", John Skilling, pp. 45–52 in Maximum Entropy and Bayesian Methods, 1989.

(List continued on next page.)

*Primary Examiner*—Vijay Chawan
*Assistant Examiner*—V. Paul Harper
(74) *Attorney, Agent, or Firm*—Fitzpatrick, Cella, Harper & Scinto

(57) ABSTRACT

A system is provided for decoding one or more sequences of sub-word units output by a speech recognition system into one or more representative words. The system uses a dynamic programming technique to align the sequence of sub-word units output by the recognition system with a number of dictionary sub-word unit sequences representative of dictionary words to identify the most likely word or words corresponding to the spoken input.

70 Claims, 9 Drawing Sheets

U.S. PATENT DOCUMENTS

| | | | |
|---|---|---|---|
| 5,781,884 A | 7/1998 | Pereira et al. | 704/260 |
| 5,787,414 A | 7/1998 | Miike et al. | 707/2 |
| 5,799,267 A | 8/1998 | Siegel | 704/1 |
| 5,835,667 A | 11/1998 | Wactlar et al. | 386/96 |
| 5,852,822 A | 12/1998 | Srinivasan et al. | 707/4 |
| 5,870,740 A | 2/1999 | Rose et al. | 707/5 |
| 5,873,061 A | 2/1999 | Hab-Umbach et al. | 704/251 |
| 5,907,821 A | 5/1999 | Kaji et al. | 704/4 |
| 5,983,177 A | 11/1999 | Wu et al. | 704/243 |
| 5,999,902 A | 12/1999 | Scahill et al. | 704/240 |
| 6,023,536 A | 2/2000 | Visser | 382/310 |
| 6,026,398 A | 2/2000 | Brown et al. | 707/5 |
| 6,061,679 A | 5/2000 | Bournas et al. | 707/3 |
| 6,172,675 B1 | 1/2001 | Ahmad et al. | 345/328 |
| 6,182,039 B1 | 1/2001 | Rigazio et al. | 704/239 |
| 6,192,337 B1 | 2/2001 | Ittycheriah et al. | 704/231 |
| 6,236,964 B1 | 5/2001 | Tamura et al. | 704/254 |
| 6,243,680 B1 | 6/2001 | Gupta et al. | 704/258 |
| 6,272,242 B1 | 8/2001 | Saitoh et al. | 382/187 |
| 6,314,400 B1 | 11/2001 | Klakow | 704/257 |
| 6,321,226 B1 | 11/2001 | Garber et al. | 707/10 |
| 6,389,395 B1 | 5/2002 | Ringland | 704/242 |
| 6,487,532 B1 | 11/2002 | Schoofs et al. | 704/251 |
| 6,490,563 B2 | 12/2002 | Hon et al. | 704/260 |
| 6,535,850 B1 | 3/2003 | Bayya | 704/239 |
| 6,567,778 B1 | 5/2003 | Chao Chang et al. | 704/257 |
| 6,567,816 B1 | 5/2003 | Desai et al. | 707/102 |
| 6,662,180 B1 | 12/2003 | Aref et al. | 707/6 |

FOREIGN PATENT DOCUMENTS

| | | |
|---|---|---|
| GB | 2 331 816 | 6/1999 |
| GB | 2 349 260 A | 10/2000 |
| WO | WO 98/47084 | 10/1998 |
| WO | WO 99/05681 | 2/1999 |
| WO | WO 00/31723 | 6/2000 |
| WO | WO 00/54168 | 9/2000 |

OTHER PUBLICATIONS

Kai–Fu Lee, "Automatic Speech Recognition", The Development of the SPHINX System, Kluwer Academic Publishers, pp. 28–29 (1989).

"Automatically Generated Word Pronunciations From Phoneme Classifier Output", Schmid, et al., Statistical Signal and Array Processing, Minneapolis, Apr. 1993, vol. 4, pp. 223–226.

"Template Averaging For Adapting A Dynamic Time Warping Speech", IBM Technical Disclosure Bulletin, IBM Corp., New York, vol. 32, No. 11, pp. 422–426.

"Creating Speaker–Specific Phonetic Templates With a Speaker–Independent Phonetic Recognizer: Implications For Voice Dialing", Jain, et al., New York, 1996, pp. 881–884.

"Phonetic String Matching: Lessons From Information Retrieva" Sigir Forum, Association for Computing Machinery, New York, 1996, pp. 166–172.

Steve Cassidy, et al., "EMU: an Enhanced Hierarchical Speech Data Management System" Proceedings of the $6^{th}$ Australian Speech Science and Technology Corp., Adelaid, pp. 381–386 (1996).

C. Gagnoulet, et al., "MAIRIEVOX: A voice–activated information system", 8308 Speech Communication, Amsterdam, Netherlands, pp. 23–31 (Feb. 10, 1991).

Steven Bird, et al., "Towards A Formal Framework For Linguistic Annotations", Linguistic Data Consortium, University of Pennsylvania, version presented at ICSLP; Sydney (Dec. 1998).

Steven Bird, et al., "A Formal Framework for Linguistic Annotation", pp. 1–37 (Aug. 13, 1999).

Martin Wechsler, "Spoken Document Retrieval Based on Phoneme Recognition", A dissertation submitted to the Swiss Federal Institute of Technology (ETH) Zurich, pp. 2–121 (1998).

Erling Wold, "Content–Based Classification, Search, and Retrieval of Audio", Multimedia IEEE, pp. 27–36 (Fall 1996).

Bahl et al., "A Method for the Construction of Acoustic Markov Models for Words," Oct. 1993, IEEE Transactions on Speech and Audio Processing, vol. 1, Issue 4, pp. 443–452.

Srinivasan et al., "Phonetic Confusion Matrix Based Spoken Document Retrieval," Proceedings of the $23^{rd}$ Annual International ACM SIGIR Conference on Research and Development in Information Retrieval, Jul. 24–28, 2000, pp. 81–87.

Kobayashi, Yutaka et al., "Matching Algorithms Between a Phonetic Lattice and Two Types of Templates—Lattice and Graph", IEEE, 1985, pp. 1597–1600.

Micca, G. et al., "Three Dimensional DP for Phonetic Lattice Matching", Digital Signal Processing–87, pp. 547–551 (1987).

Wright, Jerry et al., "Statistical Models for Topic Identification Using Phoneme Substrings", IEEE, pp. 307–310 (1996).

Ng, Kenney, "Survey of Approaches to Information Retrieval of Speech Messages", pp. 1–34, Spoken Language Systems Group, Laboratory for Computer Science, Massachusetts Institute of Technology (Feb. 16, 1996).

Foote, J.T., "Unconstrained keyword spotting using phone lattices with application to spoken document retrieval", Computer Speech and Language, pp. 207–224 (1997).

Ng, Kenney et al., "Subwork Unit Representations for Spoken Document Retrieval", EUROSPEECH (1997).

Witbrock, M.J. et al., "Using Words and Phonetic Strings for Efficient Information Retrieval from Imperfectly Transcribed Spoken Documents", School of Computer Science, Carnegie Mellon University (1997).

Ng, Kenney et al., "Phonetic Recognition for Spoken Document Retrieval", ICASSP (1998).

Wechsler, Martin et al., "Spoken Document Retrieval Based on Phoneme Recognition", pp. 1–121 (1998).

Haeb–Umbach, R. et al., "Automatic Transcription of Unknown Words in a Speech Recognition System", IEEE, pp. 840–843 (1995).

Markowitz, Judith A., "Using Speech Recognition", Prentice Hall PTR, pp. 220–221 (1996).

Jokinen, Petteri, et al., "A Comparison of Approximate String Matching Algorithms", Software–Practice and Experience, vol. 26(12), pp. 1439–1458 (Dec. 1996).

Besling, Stefan, "A Statistical Approach to Multilingual Phonetic Transcription", Philips Journal of Research, vol. 49, No. 4, pp. 367–379 (1995).

D.A. James, et al., "A Fast Lattice–Based Approach To Vocabulary Independent Wordspotting", IEEE, vol. 1, pp. 377–380 (1994).

Phillipe Gelin, et al., "Keyword Spotting for Video Soundtrack Indexing", IEEE, vol. 1, p. 299–302 (1996).

Justin Zobel, et al., "Phonetic String Matching: Lessons from Information Retrieval", Sigir Forum, Association for Computing Machinery, New York, pp. 166–172 (1996).

C. Berge, "Graphs and Hypergraphs", North Holland Mathematical Library, Amsterdam XP002192893, p. 175 (1976).

F. Schiel et al., "The Partitur Format at BAS", In Proc. of the First Int'l. Conference on Language Resources and Evaluation, Granada, Spain, 1998.

C. Gerber, "A General Approach to Speech Recognition," Proceedings of the Final Workshop on Multimedia Information Retrieval (MIRO '95), Glasgow, Scotland, Sep. 18–20, 1995, pp. 0–12.

M. Rahim, "A Neural Tree Network for Phoneme Classification with Experiments on the TIMIT Database," IEEE 1992, pp. 345–348.

H. Wang, "Retrieval of Mandarin Spoken Documents Based on Syllable Lattice Matching," Pattern Recognition Letters, 21 (Jun. 2000), pp. 615–624.

Okawa et al., "Automatic Training of Phoneme Dictionary Based on Mutual Information Criterion," IEEE 1994, pp. 241–244.

Sankoff & Kurskal, "Time Warps, String Edits, and Macromolecules: The Theory and Practice of Sequence Comparison", ISBN 0–201–07809–0, Published 1983 (and republished as ISBN 1–57586–217–4 in 1999), pp. 1–44, 213–214, 311–321 and 359–362.

* cited by examiner

SPEECH PROCESSING SYSTEM

BACKGROUND OF THE INVENTION

1. Field of the Invention

The present invention relates to an apparatus and method for decoding one or more sequences of sub-word units output by a speech recognition system into one or more representative words.

2. Description of the Related Art

The use of speech recognition systems is becoming more and more popular due to the increased processing power available to perform the recognition operation. Most speech recognition systems can be classified into small vocabulary systems and large vocabulary systems. In small vocabulary systems the speech recognition engine usually compares the input speech to be recognised with acoustic patterns representative of the words known to the system. In the case of large vocabulary systems, it is not practical to store a word model for each word known to the system. Instead, the reference patterns usually represent phonemes of a given language. In this way, the input speech is compared with the phoneme patterns to generate one or more sequences of phonemes representative of the input speech. A word decoder is then used to identify possible words corresponding to the sequence or sequences of phonemes. Typically the decoding of the phoneme sequences into these word sequences is determined by comparing the phoneme sequences with Hidden Markov Models representative of the words using a lexicon.

The present invention aims to provide an alternative technique for decoding the phoneme sequences output by the recognition engine into one or more corresponding words.

SUMMARY OF THE INVENTION

According to one aspect, the present invention provides an apparatus for identifying one or more words corresponding to a sequence of sub-word units output by a recognition system in response to a rendition of the one or more words, the apparatus comprising means for receiving the recognized sequence of sub-word units representative of the one or more words to be recognized and for receiving a plurality of dictionary sub-word sequences each representative of one or more known words; means for comparing sub-word units of the recognized sequence with sub-word units of each dictionary sequence to provide a set of comparison results; and means for identifying the one or more words using the set of comparison results.

BRIEF DESCRIPTION OF THE DRAWINGS

Exemplary embodiments of the present invention will now be described in more detail with reference to the accompanying drawings in which.

DETAILED DESCRIPTION OF THE PREFERRED EMBODIMENTS

Embodiments of the present invention can be implemented using dedicated hardware circuits, but the embodiment that is to be described is implemented in computer software or code, which is run in conjunction with a personal computer. In alternative embodiments, the software may be run in conjunction with a workstation, photocopier, facsimile machine, personal digital assistant (PDA), web browser or the like.

Figure 1:
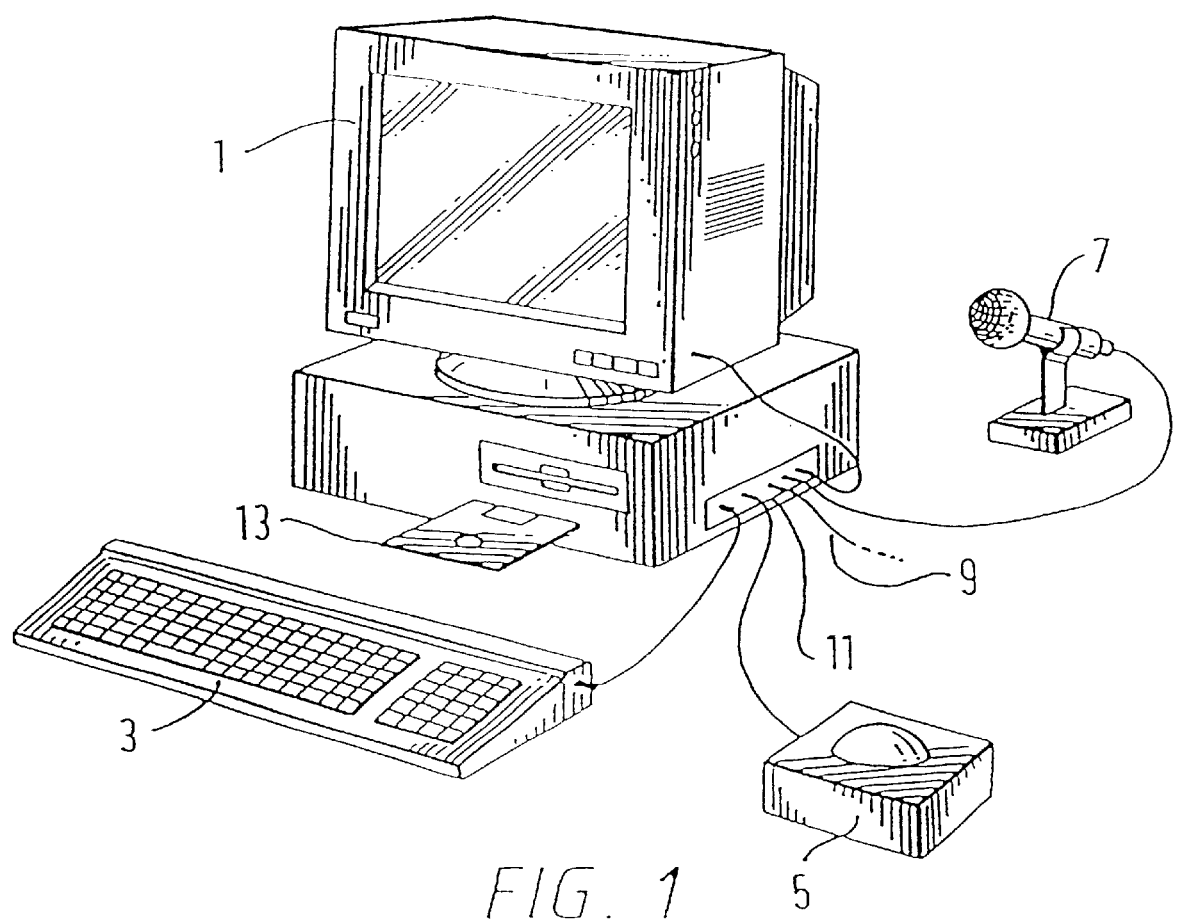
FIG. 1 is a schematic block view of a computer which may be programmed to operate an embodiment of the present invention.

FIG. 1 shows a personal computer (PC) 1 which is programmed to operate an embodiment of the present invention. A keyboard 3, a pointing device 5, a microphone 7 and a telephone line 9 are connected to the PC 1 via an interface 11. The keyboard 3 and pointing device enable the system to be controlled by a user. The microphone 7 converts the acoustic speech signal of the user into an equivalent electrical signal and supplies this to the PC 1 for processing. An internal modem and speech receiving circuit (not shown) may be connected to the telephone line 9 so that the PC 1 can communicate with, for example, a remote computer or with a remote user.

The program instructions which make the PC 1 operate in accordance with the present invention may be supplied for use with the PC 1 on, for example, a storage device such as a magnetic disc 13 or by downloading the software from a remote computer over, for example, the Internet via the internal modem and telephone unit 9.

Figure 2:
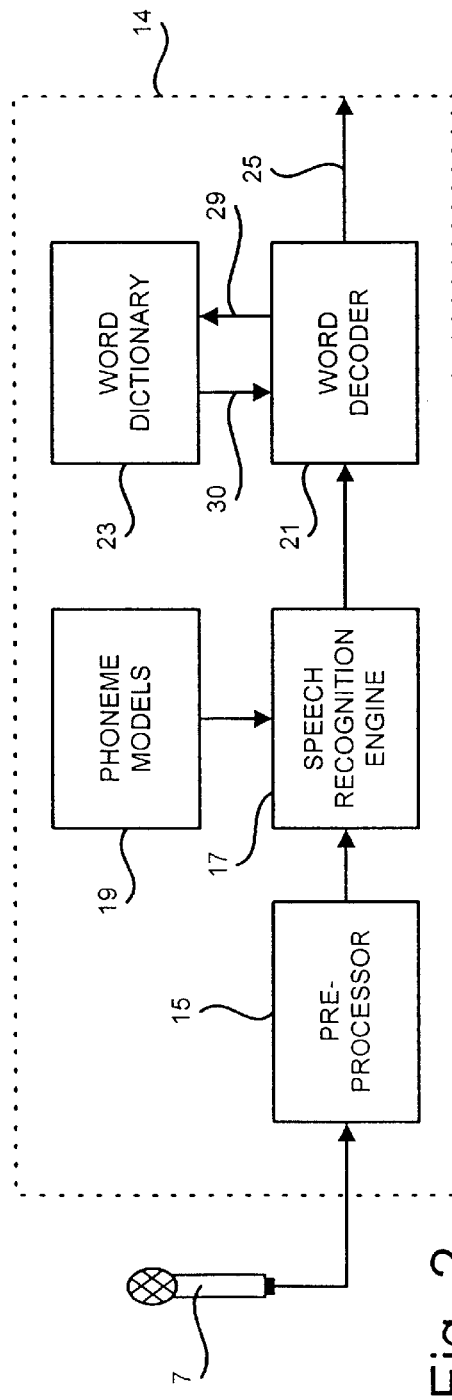
FIG. 2 is a schematic diagram of an overview of a speech recognition system embodying the present invention.

The operation of the speech recognition system 14 implemented in the PC 1 will now be described in more detail with reference to FIG. 2. Electrical signals representative of the user's input speech from the microphone 7 are applied to a preprocessor 15 which converts the input speech signal into a sequence of parameter frames, each representing a corresponding time frame of the input speech signal. The sequence of parameter frames output by the preprocessor 15 are then supplied to the speech recognition engine 17 where the speech is recognized by comparing the input sequence of parameter frames with phoneme models 19 to generate a sequence of phonemes representative of the input utterance. This sequence of phonemes is then input to a word decoder 21 which identifies words within the generated phoneme sequence by comparing it with phoneme sequences corresponding to different words which are stored in a word dictionary 23.

In particular, the word dictionary 23 includes an entry for each of the words known to the speech recognition system and, for each word, a corresponding phoneme sequence representative thereof In this embodiment, the word decoder 21 initially passes an instruction signal 29 to the word dictionary to cause a sub-set of the phoneme sequences stored in the word dictionary 23 to be downloaded 30 into the word decoder 21. This selected set of phoneme sequences is chosen so that it is representative of all the words within the word dictionary 23. The word decoder 21 then compares the beginning of the generated phoneme sequence output by the speech recognition engine 17 with the beginning of each of the selected phoneme sequences and generates a comparison scores to identify the type of words which are scoring badly and the type of words which are scoring well. The word decoder 21 then deletes the phoneme sequences which are scoring badly and sends another instruction signal 29 to the word dictionary 23 to cause similar sounding words to those that are scoring well to be downloaded into the word decoder 21. The word decoder 21 then compares the input phoneme sequence against all of the relevant phoneme sequences now stored in the word decoder 21 and generates and outputs 25 the N-best words which are then used by the PC 1 either to control the software applications running on the PC or for insertion as text into a word processing program running on the PC 1.

Word Decoding

Figure 3:
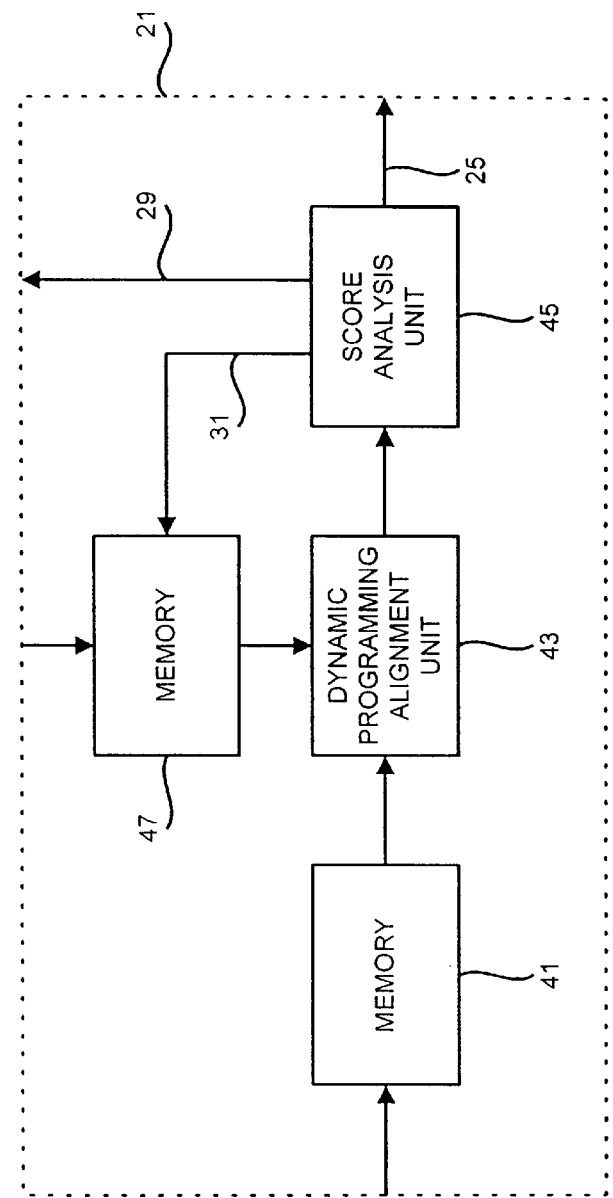
FIG. 3 is a schematic block diagram illustrating the main components of the word decoder which forms part of the speech recognition system shown in FIG. 2.

FIG. 3 shows in more detail the components of the word decoder 21 discussed above. As shown, there is a memory 41 which receives the phoneme sequence output from the speech recognition engine 17. This phoneme sequence is then input to an alignment unit 43 which, in this embodiment, uses a dynamic programming alignment technique to compare the input phoneme sequence with a plurality of phoneme sequences from the word dictionary 23, which are stored in the memory 47. In this embodiment, the alignment unit 43 performs the comparison and alignment of the input phoneme sequence with the dictionary sequences separately, but concurrently. During this alignment process, the scores for each alignment are input to a score analysis unit 45 which analyzes the scores and determines the dictionary sequences that are scoring well and those that are scoring badly. In response, the analysis unit 45 outputs a first control signal 29 to the word dictionary 23 to cause phoneme sequences for new words similar to the words that are scoring well to be into the memory 47.

The analysis unit also outputs a second control signal 31 to the memory 47 to delete the dictionary sequences which are scoring badly. In this way, the score analysis unit 45 can dynamically control the number of phoneme sequences which the dynamic programming alignment unit 43 aligns. This also allows a sub-set of the phoneme sequences in the word dictionary to be initially loaded into the memory 47 for comparison with a new input phoneme sequence. In this embodiment, this initial set of dictionary phoneme sequences are representative of all the different sounding words in the dictionary 23. This may be achieved, for example, by clustering the words in the dictionary 23 so that similar sounding words are clustered together. Then, during a matching process, one of the words from each cluster would be loaded into the memory 47 for comparison with the input phoneme sequence.

Once the input phoneme sequence has been compared with all the selected dictionary sequences, the scores for the selected dictionary sequences are then again analysed by the scores analysis unit 45 to determine the dictionary phoneme sequence having the highest score. The word corresponding to this highest scoring dictionary sequence is then output 25 by the scores analysis unit 45 as the word representative of the input phoneme sequence. In this embodiment, the score analysis unit 45 also ranks the N-best scoring dictionary sequences and outputs these as well.

If the dictionary phoneme sequences were manually generated, then it can be assumed that they are correct. However, since the speech recognition engine 17 does not generate perfect decodings of the spoken utterance, the input phoneme sequence will have insertions and deletions relative to the dictionary sequences. Further, there may also be a number of decoding errors in the input phoneme sequence relative to the dictionary sequences. As the skilled person will appreciate, most speech recognition systems available today operate with word dictionaries which were manually generated. However, dictionaries are now being created in which the dictionary phoneme sequences are generated from spoken versions of the corresponding words. Mixed dictionaries are also in existence which have phoneme sequences which were generated manually and phoneme sequences which were generated by a speech recognition system. In this case, there may be insertions, deletions and decoding errors in both the input phoneme sequence and the dictionary sequences relative to some unknown canonical sequence of phonemes which represents the text of what was actually spoken.

Figure 4:
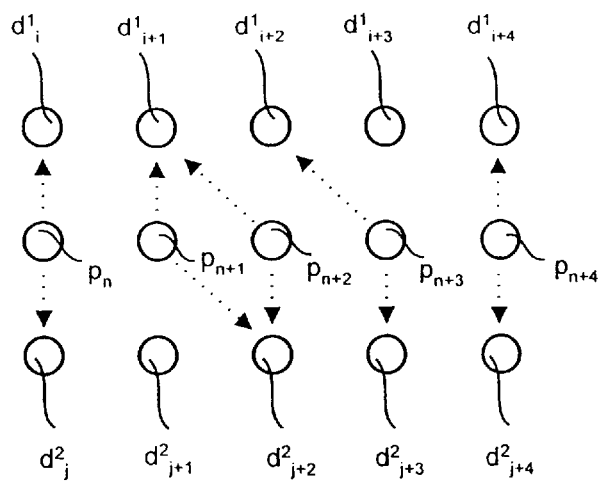
FIG. 4 is a schematic diagram which shows a first and second sequence of phonemes representative of a dictionary word and a spoken word output by the speech recognition engine shown in FIG. 2, and a third sequence of phonemes which best represents the first and second sequence of phonemes, and which illustrates the possibility of there being phoneme insertions and deletions from the first and second sequence of phonemes relative to the third sequence of phonemes.

This is illustrated in FIG. 4, which shows a possible matching between a dictionary phoneme sequence (labelled $d^1_i, d^1_{i+1}, d^1_{i+2} \ldots$) representative of a dictionary word, an input phoneme sequence (labelled $d^2_j, d^2_{j+1}, d^2_{j+2} \ldots$) and a sequence of phonemes (labelled $p_n, p_{n+1}, p_{n+2} \ldots$) which represents a canonical sequence of phonemes of the text which best matches the input sequence and the dictionary sequence. As shown in FIG. 4, the dynamic programming alignment unit 43 must allow for the insertion of phonemes in both the input and dictionary phoneme sequences (represented by the inserted phonemes $d^1_{i+3}$ and $d^2_{j+1}$) as well as the deletion of phonemes from the input and dictionary phoneme sequences (represented by phonemes $d^1_{i+1}$ and $d^2_{j+2}$, which are both aligned with two phonemes in the canonical sequence of phonemes), relative to the canonical sequence of phonemes.

In this embodiment, the alignment unit 43 uses a different scoring technique depending on whether or not the dictionary word was generated manually or from speech. This information is included within a respective label for each of the dictionary sequences which is passed to the dynamic programming alignment unit 43.

Overview of DP Alignment

As those skilled in the art of speech processing know, dynamic programming is a technique which can be used to find the optimum alignment between sequences of features, which in this embodiment are phonemes. In this embodiment, the dynamic programming alignment unit 43 calculates the optimum alignment between the input sequence and a dictionary sequence by simultaneously propagating a plurality of dynamic programming paths, each of which represents a possible alignment between a sequence of phonemes from the input sequence and a sequence of phonemes from the dictionary sequence. All paths begin at a start null node which is at the beginning of the two sequences of phonemes being aligned and propagate until they reach an end null node, which is at the end of the two sequences of phonemes being aligned.

Figure 5:
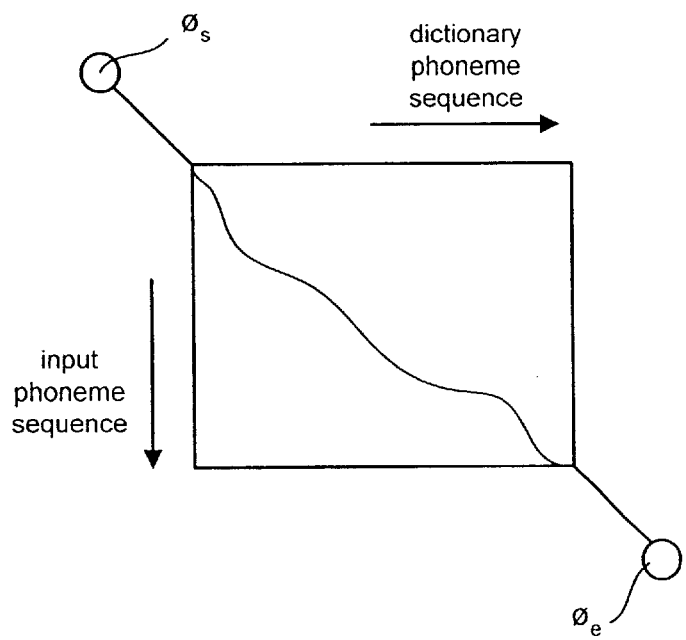
FIG. 5 schematically illustrates a search space created by the sequences of phonemes for the dictionary word and the spoken word together with a start null node and an end null node.
Figure 6:
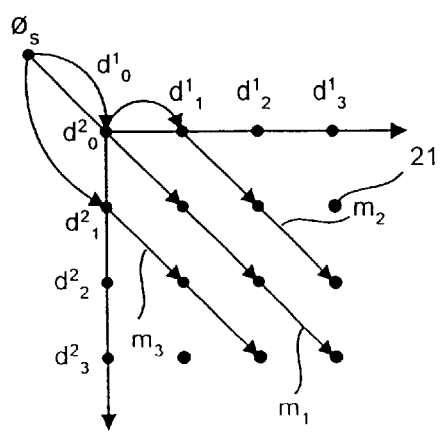
FIG. 6 is a two-dimensional plot with the horizontal axis being provided for the phonemes corresponding to the dictionary word and the vertical axis being provided for the phonemes corresponding to the spoken word, and showing a number of lattice points, each corresponding to a possible match between a phoneme of the dictionary word and a phoneme of the spoken word.

FIGS. 5 and 6 schematically illustrate the alignment which is performed and this path propagation. In particular, FIG. 5 shows a rectangular coordinate plot with the horizontal axis being provided for the dictionary phoneme sequence and the vertical axis being provided for the input phoneme sequence. The start null node $\phi_s$ is provided at the top left hand corner and the end null node $\phi_e$ is provided at the bottom right hand corner. As shown in FIG. 6, the phonemes of the dictionary sequence are provided along the horizontal axis and the phonemes of the input sequence are provided down the vertical axis. FIG. 6 also shows a number of lattice points, each of which represents a possible alignment (or decoding) between a phoneme of the input phoneme sequence and a phoneme of the dictionary phoneme sequence. For example, lattice point 21 represents a possible alignment between dictionary sequence phoneme $d^1_3$ and input sequence phoneme $d^2_1$. FIG. 6 also shows three dynamic programming paths $m_1$, $m_2$ and $m_3$ which represent three possible alignments between the input and dictionary phoneme sequences and which begin at the start null node $\phi_s$ and propagate through the lattice points to the end null node $\phi_e$.

In order to determine the best alignment between the input and dictionary phoneme sequences, the dynamic programming alignment unit 43 keeps a score for each of the dynamic programming paths which it propagates, which score is dependent upon the overall similarity of the phonemes which are aligned along the path. Additionally, in order to limit the number of deletions and insertions of phonemes in the sequences being aligned, the dynamic programming process places certain constraints on the way in which each dynamic programming path can propagate. As those skilled in the art will appreciate, the dynamic programming constraints which are used will depend upon how the dictionary phoneme sequence was generated.

DP Constraints

Dictionary Phoneme Sequence Generated Manually

Figure 7A:
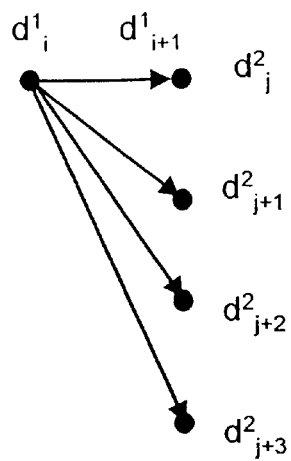
FIG. 7a schematically illustrates the dynamic programming constraints employed by the dynamic programming alignment unit which forms part of the word decoder shown in FIG. 3 when the dictionary phoneme sequence was generated manually.

In the case where the dictionary phoneme sequence is generated manually, there can be no phoneme deletions or insertions in the dictionary phoneme sequence but there can be phoneme deletions and insertions in the input phoneme sequence relative to the dictionary phoneme sequence. FIG. 7a shows the dynamic programming constraints which are used in this embodiment, for this case. As shown, if a dynamic programming path ends at lattice point (i,j) representing an alignment between dictionary phoneme $d^1_i$ and input phoneme $d^2_j$, then that dynamic programming path can propagate to the lattice points (i+1,j), (i+1,j+1), (i+1,j+2) and (i+1,j+3). The propagation to point (i+1,j) represents the case where there is a deletion of a phoneme from the input sequence as compared to the dictionary sequence; the propagation to the point (i+1,j+1) represents the situation where there is simple decoding between the next input phoneme and the next dictionary phoneme; the propagation to the point (i+1,j+2) represents the situation when there is an insertion of phoneme $d^2_{j+1}$ in the input sequence as compared with the dictionary sequence and when there is a decoding between the dictionary phoneme $d^1_{i+1}$ and the input phoneme $d^2_{j+2}$; and the propagation to point (i+1,j+3) represents the situation where there is an insertion of two phonemes ($d^2_{j+1}$ and $d^2_{j+2}$) in the input sequence as compared with the dictionary sequence and when there is a decoding between the dictionary phoneme $d^1_{i+1}$ and the input phoneme $d^2_{j+3}$.

Dictionary Sequence Generated From Speech

Figure 7B:
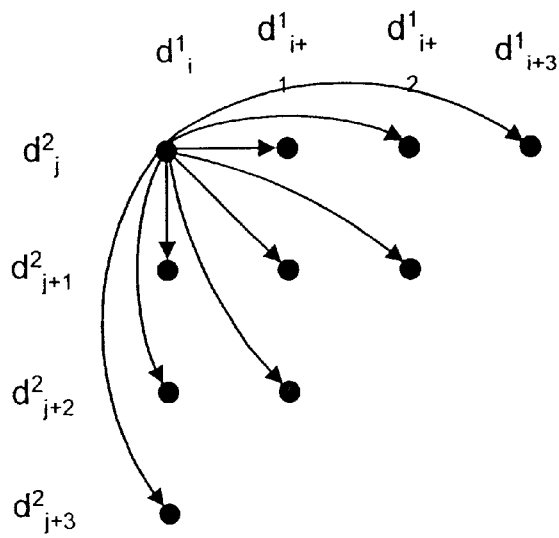
FIG. 7b schematically illustrates the dynamic programming constraints employed by the dynamic programming alignment unit which forms part of the word decoder shown in FIG. 3 when the dictionary phoneme sequence was generated from speech.

In the case where the dictionary sequence is generated from speech, phonemes can be inserted and deleted from both the dictionary sequence and the input sequence relative to the other. FIG. 7b shows the dynamic programming constraints which are used in this embodiment, for this case. In particular, if a dynamic programming path ends at lattice point (i,j), representing an alignment between dictionary phoneme $d^1_i$ and input phoneme $d^2_j$, then that dynamic programming path can propagate to the lattice points (i+1,j), (i+2,j), (i+3,j), (i,j+1), (i+1,j+1), (i+2,j+1), (i,j+2), (i+1,j+2) and (i,j+3). These propagations therefore allow the insertion and deletion of phonemes in the input and dictionary phoneme sequences relative to the unknown canonical sequence of phonemes corresponding to the text of what was actually spoken.

DP Score Propagation

As mentioned above, the dynamic programming alignment unit 78 keeps a score for each of the dynamic programming paths, which score is dependent upon the similarity of the phonemes which are aligned along the path. Therefore, when propagating a path ending at point (i,j) to these other points, the dynamic programming process adds the respective "cost" of doing so to the cumulative score for the path ending at point (i,j), which is stored in a store (SCORE(i,j)) associated with that point. In this embodiment, this cost includes insertion probabilities for any inserted phonemes, deletion probabilities for any deletions and decoding probabilities for a new alignment between a phoneme from the input phoneme sequence and a phoneme from the dictionary phoneme sequence. In particular, when there is an insertion, the cumulative score is multiplied by the probability of inserting the given phoneme; when there is a deletion, the cumulative score is multiplied by the probability of deleting the phoneme; and when there is a decoding, the cumulative score is multiplied by the probability of decoding the two phonemes.

Figure 8:
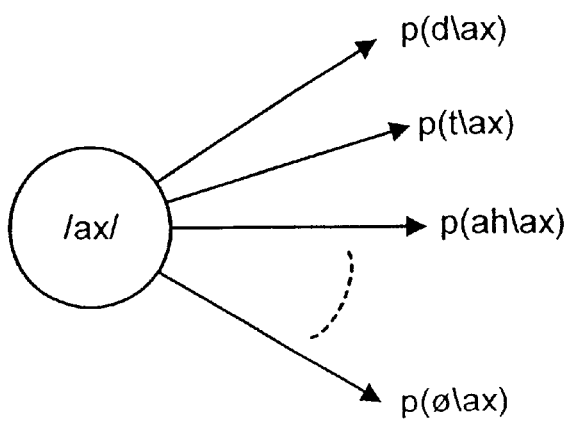
FIG. 8 schematically illustrates the deletion and decoding probabilities which are stored for an example phoneme and which are used in the scoring during the dynamic programming alignment process performed by the alignment unit shown in FIG. 3.

In order to be able to calculate these probabilities, the system stores a probability for all possible phoneme combinations in memory 47. In this embodiment, the deletion of a phoneme from either the first or second phoneme sequence is treated in a similar manner to a decoding. This is achieved by simply treating a deletion as another phoneme. Therefore, if there are 43 phonemes known to the system, then the system will store one thousand eight hundred and ninety two (1892=43×44) decoding/deletion probabilities, one for each possible phoneme decoding and deletion. This is illustrated in FIG. 8, which shows the possible phoneme decodings which are stored for the phoneme /ax/ and which includes the deletion phoneme ($\phi$) as one of the possibilities. As those skilled in the art will appreciate, all the decoding probabilities for a given phoneme must sum to one, since there are no other possibilities. In addition to these decoding/deletion probabilities, 43 insertion probabilities (PI( )), one for each possible phoneme insertion, is also stored in the memory 47. As will be described later, these probabilities are determined in advance from training data.

As mentioned above, in this embodiment, the alignment unit 43 uses a different scoring technique depending on how the dictionary sequence was generated. In particular, if the dictionary sequence was generated manually, then the dictionary phoneme is assumed to be correct and the system calculates the probability of decoding a phoneme ($d^2_j$) from the input phoneme sequence as a phoneme ($d^1_i$) from the first phoneme sequence as:

$$P(d_i^1|d_j^2) \qquad (1)$$

which is determined by simply looking up the appropriate probability stored in memory 47. However, if the dictionary phoneme sequence was generated from speech, then the alignment unit 43 calculates the probability of decoding a phoneme ($d^2_j$) from the input phoneme sequence as a phoneme ($d^1_i$) from the dictionary phoneme sequence, by summing, over all possible phonemes p, the probability of decoding the phoneme p as the dictionary phoneme $d^1_i$ and as the input phoneme $d^2_j$, weighted by the probability of phoneme p occurring unconditionally, i.e.:

$$P(d_i^1|d_j^2) = \sum_{r=1}^{N_p} P(d_i^1|p_r)P(d_j^2|p_r)P(p_r) \qquad (2)$$

where $N_p$ is the total number of phonemes known to the system; $p(d^1_i|p_r)$ is the probability of decoding phoneme $P_r$ as the dictionary phoneme $d^1_i$; $P(d^2_j|p_r)$ is the probability of decoding phoneme $p_r$ as the input phoneme $d^2_j$; and $P(p_r)$ is the probability of phoneme $P_r$ occurring unconditionally.

To illustrate the score propagations, a number of examples will now be considered. In the case where the dictionary sequence is generated manually and for the path propagating from point (i,j) to point (i+1,j+2), the input phoneme $d^2_{j+1}$ is inserted relative to the dictionary phoneme sequence and the input phoneme $d^2_{j+2}$ is decoded with the dictionary phoneme $d^1_{i+1}$. Therefore, the score propagated to point (i+1, j+2) is given by:

$$S(i+1,j+2)=S(ij)\cdot PI(d_{j+1}^2)\cdot P(d_{j+2}^2|d_{i+1}^1) \qquad (3)$$

where $PI(d^2_{j+1})$ is the probability of inserting input phoneme $d^2_{j+1}$ and $P(d^2_{j+2}|d^1_{i+1})$ represents the probability of decoding dictionary phoneme $d^1_{i+1}$ as input phoneme $d^2_{j+2}$.

In the case where the dictionary phoneme sequence was generated from speech and when propagating from lattice point (i,j) to lattice point (i+2,j+1), the dictionary phoneme $d^1_{i+1}$ is inserted relative to the input phoneme sequence and there is a decoding between dictionary phoneme $d^1_{i+2}$ and input phoneme $d^2_{j+1}$. Therefore, the score propagated to point (i+2,j+1) is given by:

$$S(i+2, j+1) = S(i, j)\cdot PI(d_{i+1}^1)\cdot \sum_{r=1}^{N_p} P(d_{i+2}^1|p_r)P(d_{j+1}^2|p_r)P(p_r) \qquad (4)$$

As those skilled in the art will appreciate, during this path propagation, several paths will meet at the same lattice point. In order that the best path is propagated, a comparison between the scores is made at each lattice point and the path having the best score is continued whilst the other path(s) is (are) discarded. In this way, once the paths have been propagated to the end node, the score for the remaining path represents the similarity between the input phoneme sequence and the dictionary phoneme sequence. As mentioned above, the score analysis unit 45 compares this score for each of the dictionary phoneme sequences to determine the N dictionary phoneme sequences most similar to the input phone sequence. The dictionary words corresponding to these dictionary phoneme sequences are then retrieved from the word dictionary and output for use by the PC 1.

DETAILED DESCRIPTION OF DP ALIGNMENT

A more detailed description will now be given of the operation of the dynamic programming alignment unit 43 when an input sequence is being aligned and compared with one of the dictionary words. (A similar alignment and comparison process is performed between the input sequence and the other selected dictionary sequences.) Initially, the scores associated with all the nodes are set to an appropriate initial value. The alignment unit 43 then propagates paths from the null start node ($\phi_s$) to all possible start points defined by the dynamic programming constraints discussed above. The dynamic programming score for the paths that are started are then set to equal the transition score for passing from the null start node to the respective start point. The paths which are started in this way are then propagated through the array of lattice points defined by the first and second phoneme sequences until they reach the null end node $\phi_e$. To do this, the alignment unit 78 processes the array of lattice points column by column in a raster like technique.

Figure 9:
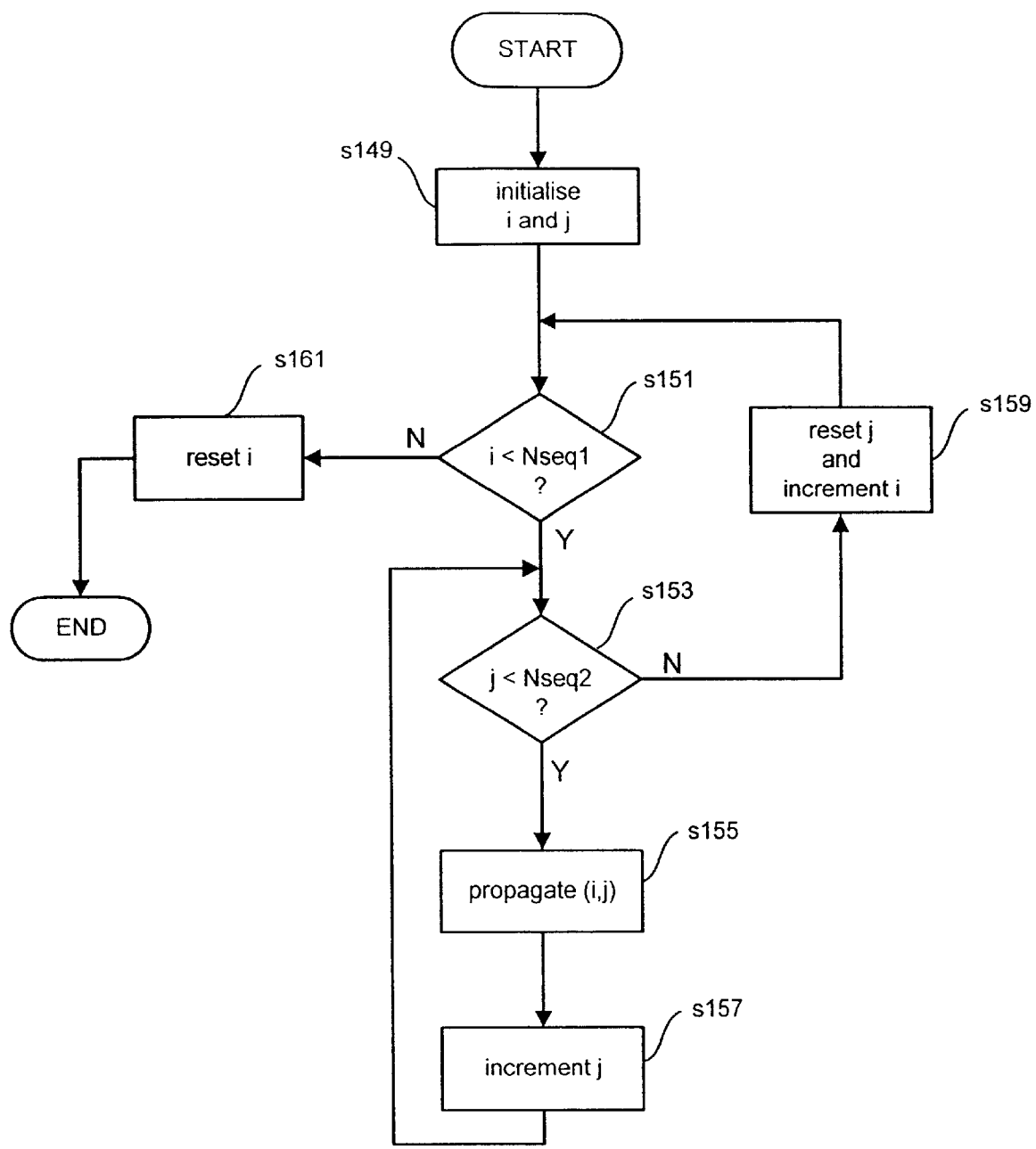
FIG. 9 is a flow diagram illustrating the main processing steps performed by the dynamic programming matching alignment unit shown in FIG. 3.

The control algorithm used to control this raster processing operation is shown in FIG. 9. As shown, in step s149, the system initializes a dictionary phoneme sequence loop pointer, i, and an input phoneme loop pointer, j, to zero. Then in step s151, the system compares the dictionary phoneme sequence loop pointer i with the number of phonemes in the dictionary phoneme sequence (Nseq1). Initially the dictionary phoneme sequence loop pointer i is set to zero and the processing therefore proceeds to step s153 where a similar comparison is made for the input phoneme sequence loop pointer j relative to the total number of phonemes in the input phoneme sequence (Nseq2). Initially the loop pointer j is also set to zero and therefore the processing proceeds to step s155 where the system propagates the path ending at lattice point (i,j) using the dynamic programming constraints discussed above. The way in which the system propagates the paths in step s155 will be described in more detail later. After step s155, the loop pointer j is incremented by one in step s157 and the processing returns to step s153. Once this processing has looped through all the phonemes in the input phoneme sequence (thereby processing the current column of lattice points), the processing proceeds to step s159 where the loop pointer j is reset to zero and the loop pointer i is incremented by one. The processing then returns to step s151 where a similar procedure is performed for the next column of lattice points. Once the last column of lattice points has been processed, the processing proceeds to step s161 where the loop pointer i is reset to zero and the processing ends.

Propagate

Figure 10:
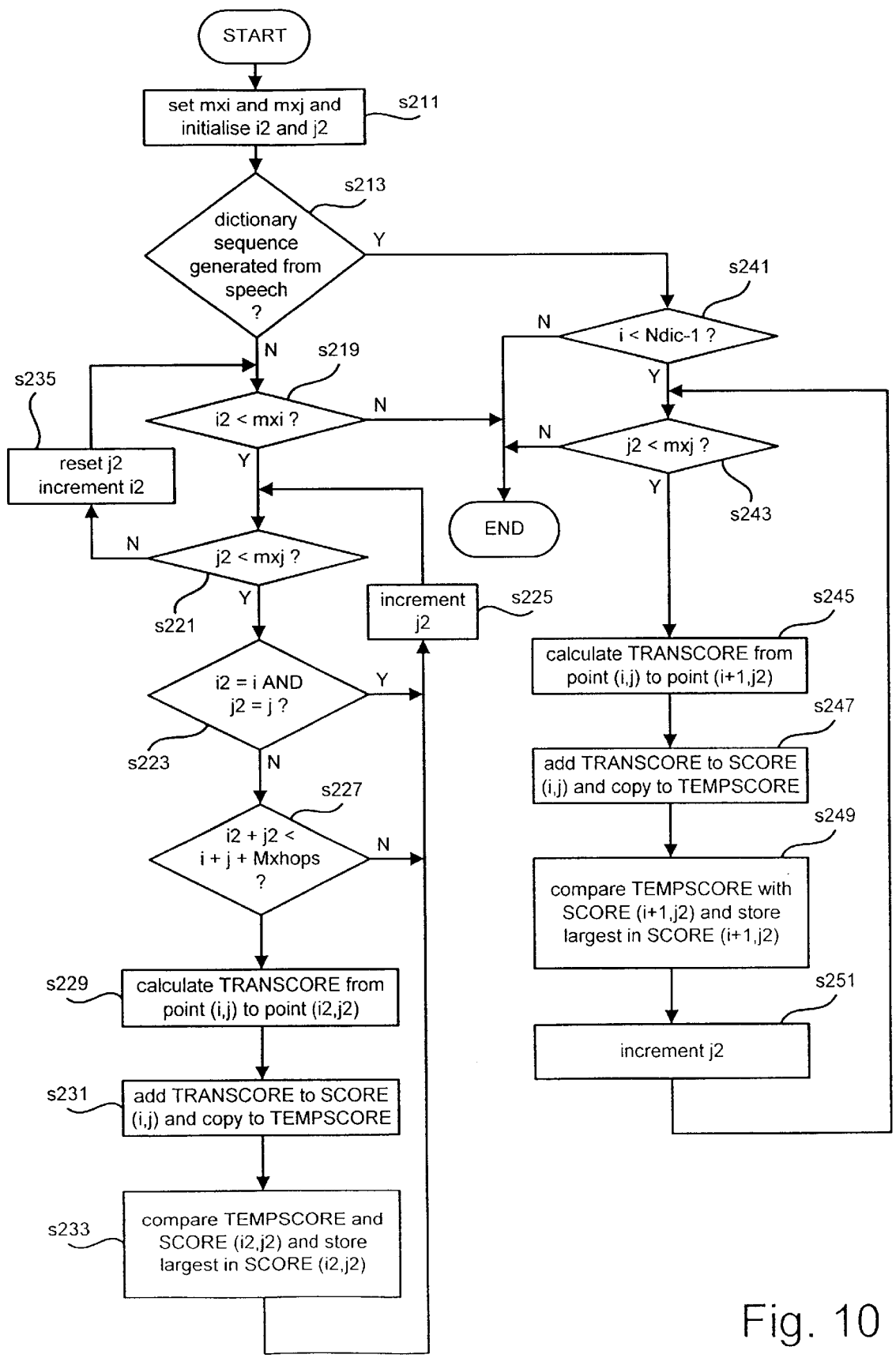
FIG. 10 is a flow diagram illustrating the main processing steps employed to propagate dynamic programming paths from the null start node to the null end node.

In step s155 shown in FIG. 9, the system propagates the path ending at lattice point (i,j) using the dynamic programming constraints discussed above. FIG. 10 is a flowchart which illustrates the processing steps involved in performing this propagation step. As shown, in step s211, the system sets the values of two variables mxi and mxj and initializes dictionary phoneme sequence loop pointer i2 and input phoneme sequence loop pointer j2. The loop pointers i2 and j2 are provided to loop through all the lattice points to which the path ending at point (i,j) can propagate to and the variables mxi and mxj are used to ensure that i2 and j2 can only take the values which are allowed by the dynamic programming constraints. In particular, mxi is set equal to i plus mxhops (which is a constant having a value which is one more than the maximum number of "hops" allowed by the dynamic programming constraints and in this embodiment is set to a value of four, since a path can jump at most to a phoneme that is three phonemes further along the sequence), provided this is less than or equal to the number of phonemes in the dictionary phoneme sequence, otherwise mxi is set equal to the number of phonemes in the dictionary phoneme sequence (Nseq1). Similarly, mxj is set equal to j plus mxhops, provided this is less than or equal to the number of phonemes in the input phoneme sequence, otherwise mxj is set equal to the number of phonemes in the input phoneme sequence (Nseq2.). Finally, in step s211, the system initializes the dictionary phoneme sequence loop pointer i2 to be equal to the current value of the dictionary phoneme sequence loop pointer i and the input phoneme sequence loop pointer j2 to be equal to the current value of the input phoneme sequence loop pointer j.

Since the dynamic programming constraints employed by the alignment unit 43 depend upon whether the dictionary phoneme sequence was generated from speech or was input manually. This determination is made in step s213. If the dictionary word was generated by speech, then the dynamic programming path ending at lattice point (i, j) can propagate to the other points shown in FIG. 7b and process steps s219 to s235 operate to propagate this path to these other points. In particular, in step s219, the system compares the dictionary phoneme sequence loop pointer i2 with the variable mxi. Since loop pointer i2 is set to i and mxi is set equal to i+4, in step s211, the processing will proceed to step s221 where a similar comparison is made for the input phoneme sequence loop pointer j2. The processing then proceeds to step s223 which ensures that the path does not stay at the same lattice point (i,j) since initially, i2 will equal i and j2 will equal j. Therefore, the processing will initially proceed to step s225 where the input phoneme loop pointer j2 is incremented by one.

The processing then returns to step s221 where the incremented value of j2 is compared with mxj. If j2 is less than mxj, then the processing returns to step s223 and then proceeds to step s227, which is operable to prevent too large a hop along both phoneme sequences. It does this by ensuring that the path is only propagated if i2+j2 is less than i+j+mxhops. This ensures that only the triangular set of points shown in FIG. 7b are processed. Provided this condition is met, the processing proceeds to step s229 where the system calculates the transition score (TRANSCORE) from lattice point (i,j) to lattice point (i2,j2). In this embodiment, the transition and cumulative scores are probability based and they are combined by multiplying the probabilities together. However, in this embodiment, in order to remove the need to perform multiplications and in order to avoid the use of high floating point precision, the system employs log probabilities for the transition and cumulative scores. Therefore, in step s231, the system adds this transition score to the cumulative score stored for the point (i,j) and copies this to a temporary store, TEMPSCORE.

As mentioned above, in this embodiment, if two or more dynamic programming paths meet at the same lattice point, the cumulative scores associated with each of the paths are compared and all but the best path (i.e. the path having the best score) are discarded. Therefore, in step s233, the system compares TEMPSCORE with the cumulative score already stored for point (i2,j2) and the largest score is stored in SCORE (i2,j2). The processing then returns to step s225 where the loop pointer j2 is incremented by one and the processing returns to step s221. Once the second phoneme sequence loop pointer j2 has reached the value of mxj, the processing proceeds to step s235, where the loop pointer j2 is reset to the initial value j and the first phoneme sequence loop pointer i2 is incremented by one. The processing then returns to step s219 where the processing begins again for the next column of points shown in FIG. 7b. Once the path has been propagated from point (i,j) to all the other points shown in FIG. 7b, the processing ends.

If the decision block s213 determines that the dictionary word was input manually, then the processing proceeds to steps s241 to s251, which are operable to propagate the path ending at point (i, j) to the points shown in FIG. 7a. In particular, in step s241, the system determines whether or not the dictionary phoneme loop pointer i is pointing to the last phoneme in the dictionary phoneme sequence. If it is, then there are no more phonemes in the dictionary phoneme sequence and the processing ends. If the dictionary phoneme loop pointer i is less than Ndic-1, then the processing proceeds to step S243, where the input phoneme loop pointer j2 is compared with mxj. Initially j2 will be less than mxj and therefore the processing proceeds to step S245 where the system calculates the transition score (TRANSCORE) from point (i,j) to point (i+1,j2). This transition score is then added to the cumulative score associated with the path ending at point (i,j) and the result is copied to the temporary score, TEMPSCORE. The system then compares, in step S249, TEMPSCORE with the cumulative score already stored for point (i+1,j2) and the largest score is stored in SCORE(i+1,j2). The processing then proceeds to step S251 where the loop pointer j2 is incremented by one and then the processing returns to step S243. Once the path which ends at point (i,j) has been propagated to the other points shown in FIG. 7a, small j2 will equal mxj and the propagation of the path ending at point (i,j) will end.

Transition Score

In steps s229 and s245 the transition score from one point (i,j) to another point (i2,j2) or (i+1,j2) is calculated. This involves calculating the appropriate insertion probabilities, deletion probabilities and decoding probabilities relative to the start point and end point of the transition. The way in which this is achieved in this embodiment, will now be described with reference to FIGS. 11 and 12.

Figure 11:
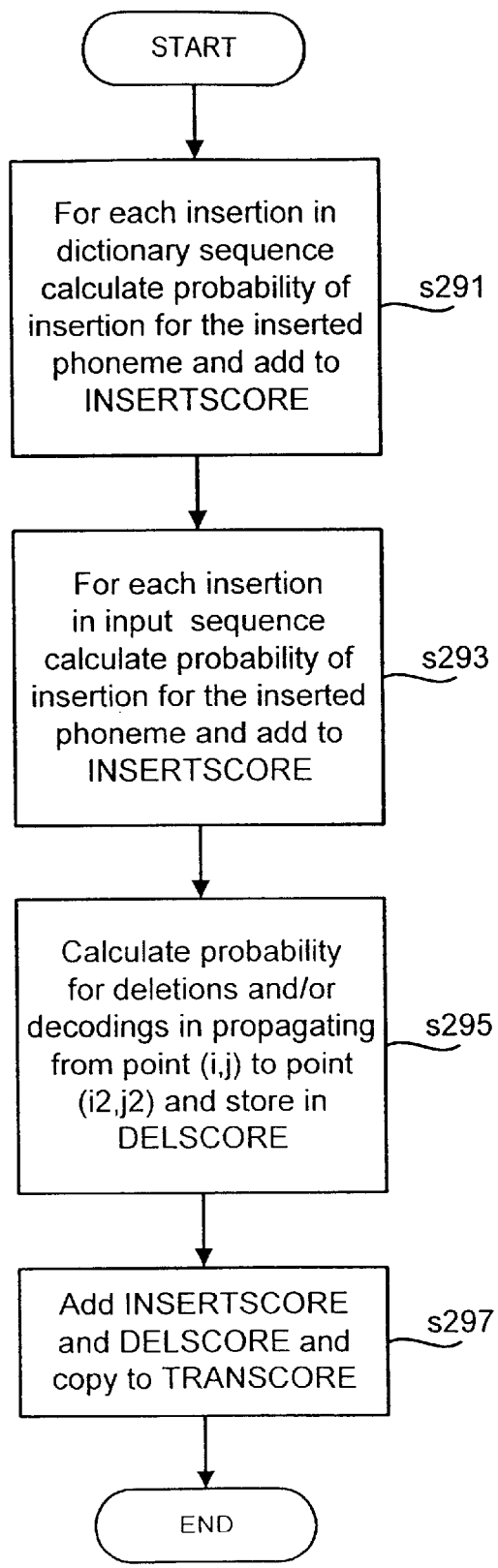
FIG. 11 is a flow diagram illustrating the processing steps involved in determining a transition score for propagating a path during the dynamic programming matching process.

In particular, FIG. 11 shows a flow diagram which illustrates the general processing steps involved in calculating the transition score for a path propagating from lattice point (i,j) to lattice point (i2,j2). In step s291, the system calculates, for each dictionary sequence phoneme which is inserted between point (i,j) and point (i2,j2), the score for inserting the inserted phoneme(s) (which is just the log of probability PI( ) discussed above) and adds this to an appropriate store, INSERTSCORE. The processing then proceeds to step s293 where the system performs a similar calculation for each input sequence phoneme which is inserted between point (i,j) and point (i2,j2) and adds this to INSERTSCORE. As mentioned above, the scores which are calculated are log based probabilities, therefore the addition of the scores in INSERTSCORE corresponds to the multiplication of the corresponding insertion probabilities. The processing then proceeds to step s295 where the system calculates (in accordance with equation (1) above) the scores for any deletions and/or any decodings in propagating from point (i,j) to point (i2,j2) and these scores are added and stored in an appropriate store, DELSCORE. The processing then proceeds to step s297 where the system adds INSERTSCORE and DELSCORE and copies the result to TRANSCORE.

Figure 12A:
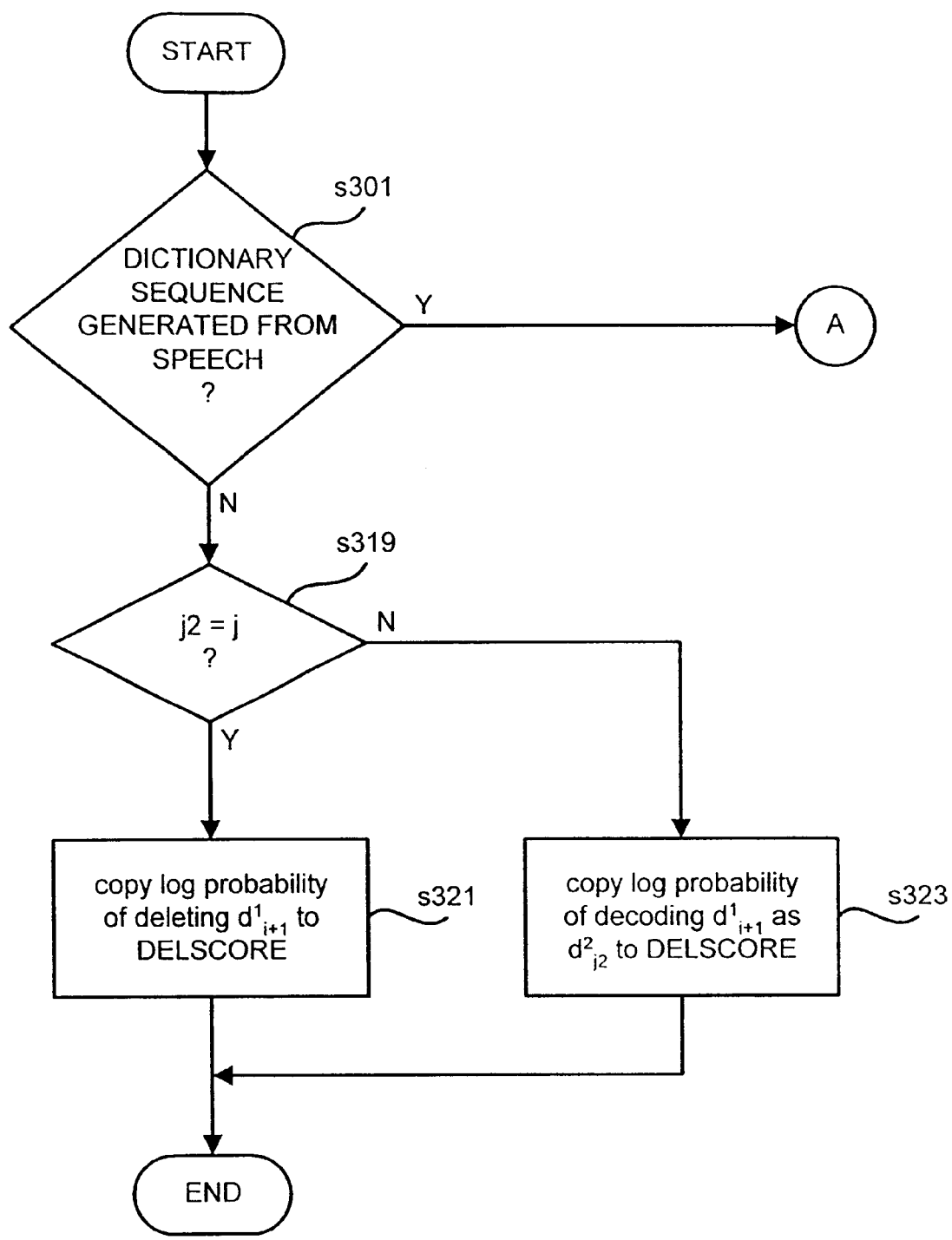
FIG. 12a is a flow diagram illustrating a first part of the processing steps employed in calculating scores for deletions and decodings of the first and second phoneme sequences corresponding to the word renditions.
Figure 12B:
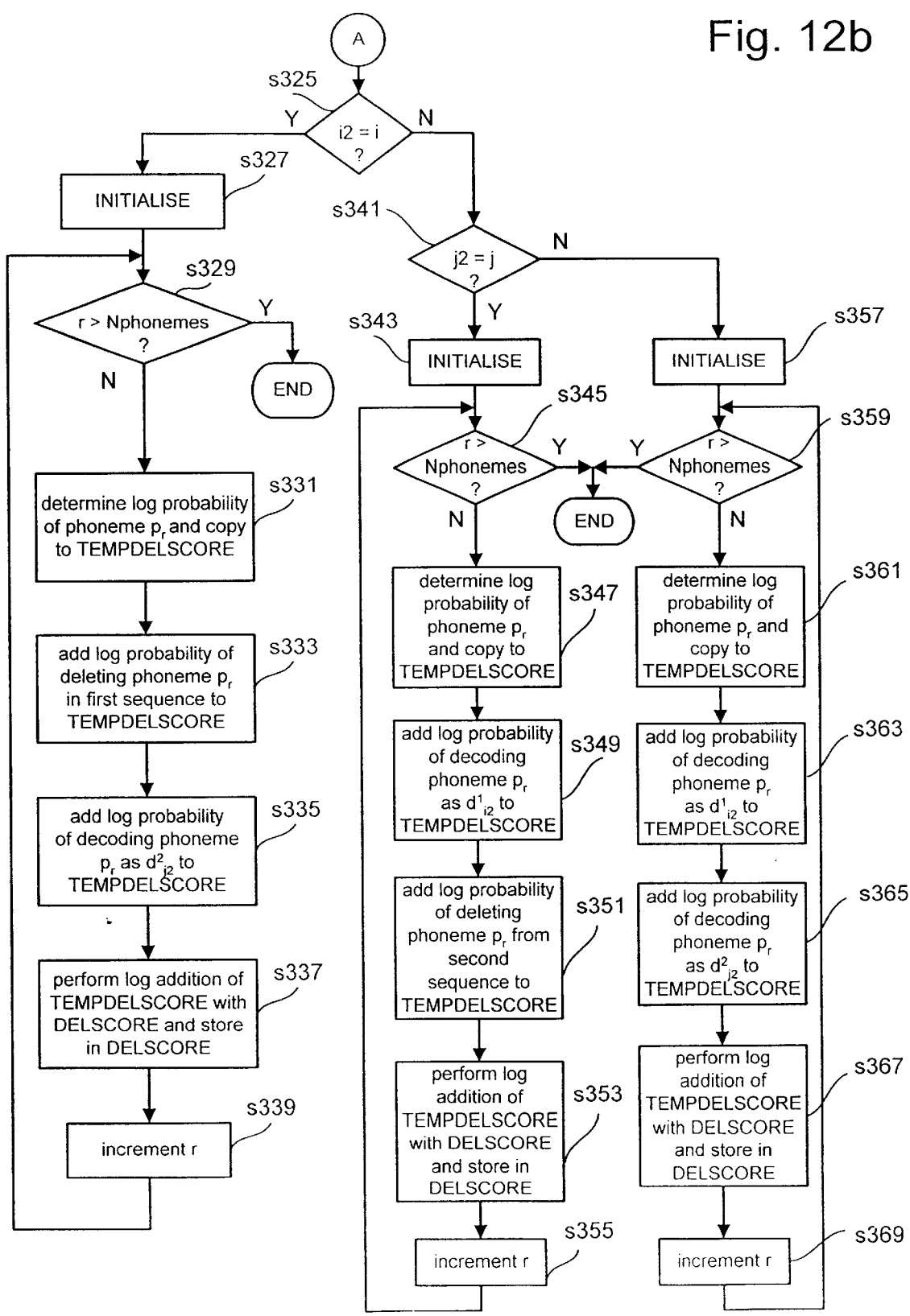
FIG. 12b is a flow diagram illustrating a second part of the processing steps employed in calculating scores for deletions and decodings of the first and second phoneme sequences corresponding to the word renditions.

The processing involved in step s295 to determine the deletion and/or decoding scores in propagating from point (i,j) to point (i2,j2) will now be described in more detail with reference to FIG. 12. Since the possible deletions and decodings depend on whether or not the dictionary sequence was generated from speech, the decision block s301 makes this determination. If the dictionary sequence was generated from speech, then the processing proceeds to step s325 shown in FIG. 12b. Otherwise the processing proceeds to step s319 where the system determines whether or not the input phoneme loop pointer j2 equals the input phoneme loop pointer j. If it does, then the system is calculating the transition score from point (i,j) to point (i+1,j). Therefore, in this case, the dictionary phoneme $d^1_{i+1}$ has been deleted from the sequence of input phonemes relative to the sequence of dictionary phonemes. Consequently, in step s321, the system determines and copies the log probability of deleting dictionary phoneme $d^1_{i+1}$ (i.e. log $P(\Phi|d^1_{i+1})$) to DELSCORE and the processing ends. If at step s319, the system determines that the input phoneme loop pointer j2 is not equal to input phoneme loop pointer j, then the system is calculating the transition score from point (i,j) to one of the points (i+1,j+1), (i+1,j+2) or (i+1,j+3). In this case, there are no deletions, only insertions and a decoding between dictionary phoneme $d^1_{i+1}$ and input phoneme $d^2_{j2}$. Therefore, in step s323, the system determines and copies the log probability of decoding dictionary phoneme $d^1_{i+1}$ as input phoneme $d^2_{j2}$ (i.e. log $P(d^2_{j2}|d^1_{i+1})$) to DELSCORE and the processing ends.

If the decision block s301 determines that the dictionary phoneme sequence was generated from speech, then the processing proceeds to step s325 where the system determines if the dictionary phoneme sequence loop pointer i2 equals dictionary phoneme sequence loop pointer i. If it does, then the processing proceeds to step s327 where a phoneme loop pointer r is initialized to one. The phoneme pointer r is used to loop through each possible phoneme known to the system during the calculation of equation (2) above. The processing then proceeds to step s329, where the system compares the phoneme pointer r with then umber of phonemes known to the system, Nphonemes (which in this embodiment equals 43). Initially, r is set to one in step s327, therefore the processing proceeds to step s331 where the system determines the log probability of phoneme Pr occurring (i.e. log $P(p_r)$) and copies this to a temporary score TEMPDELSCORE. If dictionary phoneme sequence loop pointer i2 equals dictionary phoneme loop pointer i, then the system is propagating the path ending at point (i,j)(to one of the points (i,j+1), (i,j+2) or (i,j+3). Therefore, there is a phoneme in the input phoneme sequence which is not in the dictionary phoneme sequence. Consequently, in step s133, the system adds the log probability of deleting phoneme $p_r$. from the dictionary phoneme sequence (i.e. log $P(\phi|p_r)$) to TEMPDELSCORLE. The processing then proceeds to step s335, where the system adds the log probability of decoding phoneme $p_r$ as input sequence phoneme $d^2_{j2}$ (i.e. log $P(d^2_{j2}|p_r)$) to TEMPDELSCORE. The processing then proceeds to step s337 where a "log addition" of TEMPDELSCORE and DELSCORE is performed and the result is stored in DELSCORE.

In this embodiment, since the calculation of decoding probabilities (in accordance with equation (2) above) involves summations and multiplications of probabilities. and since we are using log probabilities, this "log addition" operation effectively converts TEMPDELSCORE and DELSCORE from log probabilities back to probabilities, adds them and then reconverts them back to log probabilities. This "log addition" is a well known technique in the art of speech processing and is described in, for example, the book entitled "Automatic Speech Recognition". The development of the (Sphinx) system" by Lee, Kai-Fu published by Kluwer Academic Publishers, 1989, at pages 28 and 29. After step s337. the processing proceeds to step s339 where the phoneme loop pointer r is incremented by one and then the processing returns to step s329 where a similar processing is performed for the next phoneme known to the system. Once th is calculation has been performed for each of the 43 phonemes known to the system, the processing ends.

If at step s325, the system determines that i2 is not equal to i, then the processing proceeds to step s341 where the system determines if the input phoneme sequence loop pointer j2 equals input phoneme sequence loop pointer j. If it does, then the processing proceeds to step s343 where the phoneme loop pointer r is initialized to one. The processing then proceeds to step s345 where the phoneme loop pointer r is compared with the total number of phonemes known to the system (Nphonemes). Initially, r is set to one in step s343, and therefore, the processing proceeds to step s347 where the log probability of phoneme $p_r$ occurring is determined and copied into the temporary store TEMPDELSCORE. The processing then proceeds to step s349 where the system determines the log probability of decoding phoneme $p_r$ as dictionary phoneme $d^1_{i2}$ and adds this to TEMPDELSCORE. If the input phoneme sequence loop pointer j2 equals loop pointer j, then the system is propagating the path ending at point (i,j) to one of the points (i–1,j), (i+2,j( ) or (i+3,j). Therefore, there is a phoneme in the dictionary phoneme sequence which is not in the input phoneme sequence. consequently, in step s351, the system determines the log probability of deleting phoneme $p_r$ from the input phoneme sequence and adds this to TEMPDELSCORE. The processing then proceeds to step s353 where the system performs the log addition of TEMPDELSCORE with DELSCORE and stores the result in DELSCORE. The phoneme loop pointer r is then incremented by one in step s355 and the processing returns to step s345. Once the processing steps s347 to s353 have been performed for all the phonemes known to the system, the processing ends.

If at step s341, the system determines that input phoneme sequence loop pointer j2 is not equal to loop pointer j, then the processing proceeds to step s357 where the phoneme loop pointer r is initialized to one. The processing then proceeds to step s359 where the system compares the phoneme counter r with the number of phonemes known to the system (Nphonemes). Initially, r is set to one in step s357, and therefore, the processing proceeds to step s361 where the system determines the log probability of phoneme $p_r$ occurring and copies this to the temporary score TEMP-DELSCORE. If the loop pointer j2 is not equal to loop pointer j, then the system is propagating the path ending at point (i,j) to one of the points (i+1,j), (i+1,j+2) and d(i+2, j+1). Therefore, there are no deletions, only insertions and decodings. The processing therefore proceeds to step s363 where the log probability of decoding phoneme $p_r$ as dictionary phoneme $d^1_{i2}$ is added to TEMPDELSCORE. The processing then proceeds to step s365 where the log probability of decoding phoneme $p_r$ as input phoneme $d^2_{j21}$ is determined and added to TEMPDELSCORE. The system then performs, in step s367, the log addition of TEMP-DELSCORE with DELSCORE and stores the result in DELSCORE. The phoneme counter r is then incremented by one in step s369 and the processing returns to step s359. Once processing steps s361 to s367 have been performed for all the phonemes known to the system, the processing ends.

Training

In the above embodiment, the dynamic programming alignment unit 78 43 used 1892 decoding/deletion probabilities and 43 insertion probabilities to score the dynamic programming paths in the phoneme alignment operation. In this embodiment, these probabilities are determined in advance during a training session and are stored in the memory 47. In particular, during this training session, a speech recognition system is used to provide a phoneme decoding of speech in two ways. In the first way, the speech recognition system is provided with both the speech and the actual words which are spoken. The speech recognition system can therefore use this information to generate the canonical phoneme sequence of the spoken words to obtain an ideal decoding of the speech. The speech recognition system is then used to decode the same speech, but this time without knowledge of the actual words spoken (referred to hereinafter as the free decoding). The phone sequence generated from the free decoding will differ from the canonical phoneme sequence in the following ways:

i) the free decoding may make mistakes and insert phonemes into the decoding which are not present in the canonical sequence or, alternatively, omit phonemes in the decoding which are present in the canonical sequence;

ii) one phoneme may be confused with another; and iii) even if the speech recognition system decodes the speech perfectly, the free decoding may nonetheless differ from the canonical decoding due to the differences between conversational pronunciation and canonical pronunciation, e.g., in conversational speech the word "and" (whose canonical forms are /ae/ /n/ /d/ and /ax/ /n/ /d/) is frequently reduced to /ax/ /n/ or even /n/.

Therefore, if a large number of utterances are decoded into their canonical forms and their free decoded forms, then a dynamic programming method (similar to the one described above) can be used to align the two. This provides counts of what was decoded, d, when the phoneme should, canonically, have been a p. From these training results, the above decoding, deletion and insertion probabilities can be approximated in the following way.

The probability that phoneme, d, is an insertion is given by:

$$PI(d) = \frac{I_d}{n_o^d} \quad (5)$$

where $I_d$ is the number of times the automatic speech recognition system inserted phoneme d and $n_o^d$ is the total number of decoded phonemes which are inserted relative to the canonical sequence.

The probability of decoding phoneme p as phoneme d is given by:

$$P(d|p) = \frac{c_{dp}}{n_p} \quad (6)$$

where $c_{dp}$ is the number of times the automatic speech recognition system decoded d when it should have been p and $n_p$ is the number of times the automatic speech recognition system decoded anything (including a deletion) when it should have been p.

The probability of not decoding anything (i.e. there being a deletion) when the phoneme p should have been decoded is given by:

$$P(\emptyset|p) = \frac{O_p}{n_p} \quad (7)$$

where $O_p$ is the number of times the automatic speech recognition system decoded nothing when it should have decoded p and $n_p$ is the same as above.

Alternative Embodiments

As those skilled in the art will appreciate, whilst the term "phoneme" has been used throughout the above description, the present application is not limited to its linguistic meaning, but includes the different sub-word units that are normally identified and used in standard speech recognition systems. In particular, the term "phoneme" covers any such sub-word unit, such as phones, syllables or katakana (Japanese alphabet).

As those skilled in the art will appreciate, the above description of the dynamic programming alignment of the sequences of phonemes was given by way of example only and various modifications can be made. For example, whilst a raster scanning technique for propagating the paths through the lattice points was employed, other techniques could be employed which progressively propagate the paths through the lattice points. Additionally, as those skilled in the art will appreciate, dynamic programming constraints other than those described above may be used to control the matching process.

In the above embodiment, when the dictionary phoneme was generated from speech, the dynamic programming alignment unit calculated decoding scores for each transition using equation (2) above. Instead of summing over all possible phonemes known to the system in accordance with equation (2), the dynamic programming alignment unit may be arranged, instead, to identify the unknown phoneme, p, which maximises the probability term within the summation and to use this maximum probability term as the probability of decoding the corresponding phonemes in the input sequences.

In the above embodiment, the insertion, deletion and decoding probabilities were calculated from statistics of the speech recognition system using a maximum likelihood estimate of the probabilities. As those skilled in the art of statistics will appreciate, other techniques, such as maximum entropy techniques, can be used to estimate these probabilities. Details of a suitable maximum entropy technique can be found at pages 45 to 52 in the book entitled "Maximum Entropy and Bayesian Methods" published by Kluwer Academic publishers and written by John Skilling, the contents of which are incorporated herein by reference.

In the above embodiments, a dynamic programming algorithm was used to align the sequence of phonemes output by the speech recognition engine with each dictionary phoneme sequence. As those skilled in the art will appreciate, any alignment technique could be used. For example, a naive technique could be used which considers all possible alignments. However, dynamic programming is preferred because of its ease of implementation using standard processing hardware. Additionally, whilst in the above embodiment, the dynamic programming alignment unit determined the "best" alignment between the input sequences of phonemes, this may not, in some applications, be strictly necessary. For example, the second, third or fourth best alignment may be used instead.

In the embodiment described above, during the dynamic programming algorithm, equation (2) was calculated for each aligned pair of phonemes when the dictionary sequence was generated from speech. In the calculation of equation (2), the dictionary sequence phoneme and the input sequence phoneme were compared with each of the phonemes known to the system. As those skilled in the art will appreciate, for a given dictionary sequence phoneme and input sequence phoneme pair, many of the probabilities given in equation (2) will be equal to or very close to zero. Therefore, in an alternative embodiment the aligned phonemes may only be compared with a subset of all the known phonemes, which subset is determined in advance from the training data. To implement such an embodiment, the input phonemes to be aligned could be used to address a lookup table which would identify the phonemes which need to be compared with them using equation (2).

In the above embodiment, the same phoneme confusion probabilities were used for both the input phoneme sequence to be recognized and the dictionary phoneme sequences. As those skilled in the art will appreciate, if different recognition systems are used to generate these, then different phoneme confusion probabilities should be used, since these depend upon the recognition system that was used to generate the phoneme sequences.

A number of embodiments and modifications have been described above. As those skilled in the art will appreciate, there are many other embodiments and modifications which will be apparent to those skilled in the art.

What is claimed is:

1. An apparatus for identifying one or more words corresponding to a sequence of sub-word units output by a recognition system in response to a rendition of the one or more words, the apparatus comprising:

first receiving means for receiving the recognised sequence of sub-word units representative of the one or more words to be identified;

second receiving means for receiving a plurality of dictionary sub-word sequences, each representative of one or more known words;

means for comparing sub-word units of the recognised sequence with sub-word units of each dictionary sequence to provide a set of comparison scores;

means for combining the comparison scores obtained by comparing the sub-word units of the recognised sequence with the sub-word units of the same dictionary sequence to provide, for each dictionary word, a measure of the similarity between the recognised sequence and the dictionary sequence; and means for identifying said one or more words using the similarity measures provided by the combining means;

wherein said comparing means comprises:

means for aligning sub-word units of the recognised sequence with sub-word units of the same dictionary sequence to form, for each dictionary sequence, a number of aligned pairs of sub-word units;

first sub-comparing means for comparing, for each aligned pair, the recognised sequence sub-word unit in the aligned pair with each of a plurality of sub-word units taken from a set of predetermined sub-word units, to generate a corresponding plurality of intermediate comparison scores representative of the similarities between the recognised sequence sub-word unit and the respective sub-word units of the set;

second sub-comparing means for comparing, for each aligned pair, the dictionary sequence sub-word unit in the aligned pair with each of said plurality of sub-word units from the set to separate a further corresponding plurality of intermediate comparison scores representative of the similarities between said dictionary sequence sub-word unit and the respective sub-word units of the set; and means for calculating, for each aligned pair, a comparison score representative of the similarity between the sub-word units of the aligned pair by combining the pluralities of intermediate comparison scores generated by said first and second sub-comparing means, to provide said set of comparison scores.

2. An apparatus according to claim 1, wherein said comparing means is operable to compare the recognised sequence with the plurality of dictionary sequences concurrently.

3. An apparatus according to claim 1, wherein said first and second sub-comparing means are operable to compare the recognised sequence sub-word unit and the dictionary sequence sub-word unit respectively with each of the sub-word units in the set of sub-word units.

4. An apparatus according to claim 1, wherein said first and second sub-comparing means are operable to provide intermediate comparison scores which are indicative of a probability of confusing the corresponding sub-word unit taken from said set of predetermined sub-word units as the sub-word unit in the aligned pair.

5. An apparatus according to claim 4, wherein said calculating means is operable to combine the intermediate comparison scores in order to multiply the probabilities of confusing the corresponding sub-word unit taken from the set as the sub-word units in the aligned pair.

6. An apparatus according to claim 5, wherein each of said sub-word units in said set of predetermined sub-word units has a predetermined probability of occurring within a sequence of sub-word units and wherein said calculating means is operable to weight each combined comparison score in dependence upon the respective probability of occurrence for the sub-word unit of the set used to generate the combined comparison score.

7. An apparatus according to claim 6, wherein said calculating means is operable to combine said intermediate comparison scores by calculating:

$$P(d_i^1|p_r)P(d_j^2|p_r)P(p_r)$$

where $d_i^1$ and $d_j^2$ are an aligned pair of dictionary and recognised sequence sub-word units respectively; $P(d_j^2|p_r)$ is the intermediate comparison score output by said first sub-comparing means and is representative of the probability of confusing set sub-word unit $p_r$ as recognised sequence sub-word unit $d_j^2$; $P(d_i^1|p_r)$ is the intermediate comparison score output by said second sub-comparing means and is representative of the probability of confusing set sub-word unit $p_r$ as dictionary sequence sub-word unit $d^1_i$; and $P(p_r)$ is a weight which represents the probability of set sub-word unit $P_r$ occurring in a sequence of sub-word units.

8. An apparatus according to claim 7, wherein the confusion probabilities for the recognised sequence sub-word units and the dictionary sequence sub-word units are determined in advance and depend upon the recognition system that was used to generate the respective sub-word unit sequences.

9. An apparatus according to claim 5, wherein said intermediate comparison scores represent log probabilities and wherein said calculating means is operable to multiply said probabilities by adding the respective intermediate comparison scores.

10. An apparatus according to claim 1, wherein each of the sub-word units in said dictionary and recognised sequences of sub-word units belong to said set of predetermined sub-word units and wherein said first and second sub-comparing means are operable to provide said comparison scores using predetermined data which relate the sub-word units in said set to each other.

11. An apparatus according to claim 10, wherein said predetermined data comprises, for each sub-word unit in the set of sub-word units, a probability for confusing that sub-word unit with each of the other sub-word units in the set of sub-word units.

12. An apparatus according to claim 1, wherein said aligning means comprises dynamic programming means for aligning said dictionary and recognised sequences of sub-word units using a dynamic programming technique.

13. An apparatus according to claim 1, wherein each of said sub-word units represents a phoneme.

14. An apparatus according to claim 1, wherein the calculating means is operable to combine the intermediate comparison scores obtained by the first and second sub-comparing means when comparing the recognised sequence sub-word unit and the dictionary sequence sub-word unit in an aligned pair with the same sub-word unit from the set of predetermined sub-word units, to generate a plurality of combined intermediate comparison scores and is operable to generate said comparison score for the aligned pair from the plurality of combined intermediate comparison scores generated for the aligned pair.

15. An apparatus according to claim 1, wherein said comparing means has a plurality of different comparison modes of operation and wherein the apparatus further comprises:
means for determining if the current dictionary sequence of sub-word units was generated from an audio input or a typed input and for outputting a determination result; and
means for selecting, for the current dictionary sub-word sequence, the mode of operation of said comparing means in dependence upon said determination result.

16. An apparatus according to claim 15, wherein said comparing means includes third sub-comparing means operable to compare, for each aligned pair, the recognised sequence sub-word unit in the aligned pair with the dictionary sequence sub-word unit in the aligned pair by calculating:

$$P(d_i^1 | d_j^2)$$

wherein $d_i^1$ and $d_j^2$ are an aligned pair of dictionary and recognised sequence sub-word units respectively, to provide a comparison score for the aligned pair; and wherein said comparing means is operable in a first comparison mode to determine said set of comparison scores using said first and second sub-comparing means, and is operable in a second comparison mode to determine said set of comparison scores using said third sub-comparing means.

17. An apparatus according to claim 16, wherein the selecting means is operable to select said first comparison mode of said comparing means when said determining means determines that the current dictionary sequence of sub-word units was generated from an audio input and to select said second comparison mode of said comparing means when said determining means determines that the current dictionary sequence of sub-word units was generated from a typed input.

18. An apparatus for identifying one or more words corresponding to a sequence of sub-word units output by a recognition system in response to a rendition of the one or more words, the apparatus comprising:
first receiving means for receiving the recognised sequence of sub-word units representative of the one or more words to be identified;
second receiving means for receiving a plurality of dictionary sub-word sequences, each representative of one or more known words;
means for comparing sub-word units of the recognised sequence with sub-word units of each dictionary sequence to provide a set of comparison results;
means for combining the comparison results obtained by comparing the sub-word units of the recognised sequence with the sub-word units of the same dictionary sequence to provide, for each dictionary sequence, a measure of the similarity between the recognised sequence and the dictionary sequence; and
means for identifying said one or more words using the similarity measures provided by the combining means;
wherein said comparing means has a plurality of different comparison modes of operation and wherein the apparatus further comprises:
means for determining if the current dictionary sequence of sub-word units was generated from an audio input or a typed input and for outputting a determination result; and
means for selecting, for the current dictionary sub-word sequence, the mode of operation of said comparing means in dependence upon said determination result.

19. An apparatus according to claim 18, wherein each dictionary sequence of sub-word units has a respective label indicating if the sequence of sub-word units was generated from an audio input or a typed input, and wherein said determined means is operable to determine if the current dictionary sequence of sub-word units was generated from an audio input or a typed input in dependence upon the respective label.

20. An apparatus according to claim 18, wherein each of said sub-word units represents a phoneme.

21. A speech recognition system comprising:
means for receiving speech signals to be recognised;
means for storing sub-word unit models;
means for comparing the received speech signals with the sub-word unit models to generate one or more sequences of sub-word units representative of the received speech signals;
a word dictionary relating sequences of sub-word units to words; and a word decoder for processing the one or more sequences of sub-word units output by said comparing means using the word dictionary to generate one or more words corresponding to the received speech signals;

wherein said word decoder comprises:
   first receiving means for receiving the recognised sequence of sub-word units representative of the received speech signals;
   second receiving means for receiving from said word dictionary a plurality of dictionary sub-word sequences, each representative of one or more known words;
   means for comparing sub-word units of the recognised sequence with sub-word units of each received dictionary sequence to provide a set of comparison scores;
   means for combining the comparison scores obtained by comparing the sub-word units of the recognised sequence with the sub-word units of each received dictionary to provide, for each dictionary sequence, a measure of the similarity between the recognised sequence and each received dictionary sequence; and
   means for identifying said one or more words using the similarity measures provided by the combining means;

wherein said comparing means comprises:
   means for aligning sub-word units of the recognised sequence with sub-word units of each received dictionary sequence to form a number of aligned pairs of sub-word units;
   first sub-comparing means for comparing, for each aligned pair, the recognised sequence sub-word unit in the aligned pair with each of a plurality of sub-word units taken from a set of predetermined sub-word units, to generate a corresponding plurality of intermediate comparison scores representative of the similarities between the recognised sequence sub-word unit and the respective sub-word units of the set;
   second sub-comparing means for comparing, for each aligned pair, the dictionary sequence sub-word unit in the aligned pair with each of said plurality of sub-word units from the set to generate a further corresponding plurality of intermediate comparison scores representative of the similarities between said dictionary sequence sub-word unit and the respective sub-word units of the set; and
   means for calculating, for each aligned pair, a comparison score representative of the similarity between the sub-word units of the aligned pair by combining the pluralities of intermediate comparison scores generated by said first and second sub-comparing means, to provide said set of comparison scores.

22. A method of identifying one or more words corresponding to a sequence of sub-word units output by a recognition system in response to a rendition of the one or more words, the method comprising:
   a first receiving step of receiving the recognised sequence of sub-word units representative of the one or more words to be identified;
   a second receiving step of receiving a plurality of dictionary sub-word sequences, each representative of one or more known words;
   comparing sub-word units of the recognised sequence with sub-word units of each dictionary sequence to provide a set of comparison scores;
   combining the comparison scores obtained by comparing the sub-word units of the recognised sequence with the sub-word units of the same dictionary sequence to provide, for each dictionary sequence, a measure of the similarity between the recognised sequence and the dictionary sequence; and
   identifying said one or more words using the similarity measures provided by the combining step;

wherein said comparing step comprises:
   aligning sub-word units of the recognised sequence with sub-word units of the same dictionary sequence to form, for each dictionary sequence, a number of aligned pairs of sub-word units;
   a first sub-comparing step for comparing, for each aligned pair, the recognised sequence sub-word unit in the aligned pair with each of a plurality of sub-word units taken from a set of predetermined sub-word units, to generate a corresponding plurality of intermediate comparison scores representative of the similarities between the recognised sequence sub-word unit and the respective sub-word units of the set;
   a second sub-comparing step of comparing, for each aligned pair, the dictionary sequence sub-word unit in the aligned pair with each of said plurality of sub-word units from the set to generate a further corresponding plurality of intermediate comparison scores representative of the similarities between said dictionary sequence sub-word unit and the respective sub-word units of the set; and
   calculating, for each aligned pair, a comparison score representative of the similarity between the sub-word units of the aligned pair by combining the pluralities of intermediate comparison scores generated by said first and second sub-comparing steps, to provide said set of comparison scores.

23. A method according to claim 22, wherein said comparing step compares the recognised sequence with the plurality of dictionary sequences concurrently.

24. A method according to claim 22, wherein said first and second sub-comparing steps compare the recognised sequence sub-word unit and the dictionary sequence sub-word unit respectively with each of the sub-word units in the set of sub-word units.

25. A method according to claim 22, wherein said first and second sub-comparing steps provide intermediate comparison scores which are indicative of a probability of confusing the corresponding sub-word unit taken from a set of predetermined sub-word units as the sub-word unit in the aligned pair.

26. A method according to claim 25, wherein said calculating step combines the intermediate comparison scores in order to multiply the probabilities of confusing the corresponding sub-word unit taken from the set as the sub-word units in the aligned pair.

27. A method according to claim 26, wherein each of said sub-word units in said set of predetermined sub-word units has a predetermined probability of occurring within a sequence of sub-word units and wherein said calculating step weights each combined comparison score in dependence upon the respective probability of occurrence for the sub-word unit of the set used to generate the combined comparison score.

28. A method according to claim 27, wherein said calculating step combines said intermediate comparison scores by calculating:

$$P(d_i^1|p_r)P(d_j^2|p_r)P(p_r)$$

where $d_i^1$ and $d_j^2$ are an aligned pair of dictionary and recognised sequence sub-word units respectively; $P(d^2_j|p_r)$ is the intermediate comparison score output by said first sub-comparing step and is representative of the probability of confusing set sub-word unit $p_r$ as recognised sequence sub-word unit $d^2_j$; $P(d^1_i|p_r)$ is the intermediate comparison score output by said second sub-comparing step and is representative of the probability of confusing set sub-word unit $p_r$ as dictionary sequence sub-word unit $d^1_i$; and $P(p_r)$ is a weight which represents the probability of set sub-word unit $p_r$ occurring in a sequence of sub-word units.

29. A method according to claim 28, wherein the confusion probabilities for the recognised sequence sub-word units and the dictionary sequence sub-word units are determined in advance and depend upon the recognition system that was used to generate the respective sub-word unit sequences.

30. A method according to claim 26, wherein said intermediate comparison scores represent log probabilities and wherein said calculating step multiplies said probabilities by adding the respective intermediate comparison scores.

31. A method according to claim 22, wherein each of the sub-word units in said dictionary and recognised sequences of sub-word units belong to said set of predetermined sub-word units and wherein said first and second sub-comparing means are operable to provide said comparison scores using predetermined data which relate the sub-word units in said set to each other.

32. A method according to claim 31, wherein said predetermined data comprises, for each sub-word unit in the set of sub-word units, a probability for confusing that sub-word unit with each of the other sub-word units in the set of sub-word units.

33. A method according to claim 22, wherein said aligning step uses a dynamic programming technique to align said dictionary and recognised sequences of sub-word units.

34. A method according to claim 22, wherein each of said sub-word units represents a phoneme.

35. A method according to claim 22, wherein the calculating step combines the intermediate comparison scores obtained by the first and second sub-comparing steps when comparing the recognised sequence sub-word unit and the dictionary sequence sub-word unit in an aligned pair with the same sub-word unit from the set of predetermined sub-word units, to generate a plurality of combined intermediate comparison scores and generates said comparison score for the aligned pair from the plurality of combined intermediate comparison scores generated for the aligned pair.

36. A method according to claim 22, further comprising the steps of:
    determining if the current dictionary sequence of sub-word units was generated from an audio input or a typed input and outputting a determination result; and
    selecting, for the current dictionary sub-word sequence, a comparison technique employed in said comparing step in dependence upon said determination result.

37. A method according to claim 36, wherein in a first comparison technique, said comparing step comprises said first and second comparing steps and said calculating step and in a second comparison technique comprises a third sub-comparing step of comparing, for each aligned pair, the recognised sequence sub-word unit in the aligned pair with the dictionary sequence sub-word unit in the aligned pair by calculating:

$$P(d_i^1|d_j^2)$$

wherein $d_i^1$ and $d_j^2$ are an aligned pair of dictionary and recognised sequence sub-word units respectively, to provide a comparison score for the aligned pair.

38. A method according to claim 37, wherein the selecting step selects said first comparison technique when said determining step determines that the current dictionary sequence of sub-word units was generated from an audio input and selects said second comparison technique when said determining step determines that the current dictionary sequence of sub-word units was generated from a typed input.

39. A method of identifying one or more words corresponding to a sequence of sub-word units output by a recognition system in response to a rendition of the one or more words, the method comprising:
    a first receiving step of receiving the recognised sequence of sub-word units representative of the one or more words to be identified;
    a second receiving step of receiving a plurality of dictionary sub-word sequences, each representative of one or more known words;
    comparing, using a sub-word comparator, sub-word units of the recognised sequence with sub-word units of each dictionary sequence to provide a set of comparison results;
    combining the comparison results obtained by comparing the sub-word units of the recognised sequence with the sub-word units of the same dictionary sequence to provide, for each dictionary sequence, a measure of the similarity between the recognised sequence and the dictionary sequence; and
    identifying said one or more words using the similarity measures provided by the combining step;
    wherein said sub-word comparator has a plurality of different comparison modes of operation and wherein the method further comprises:
        determining if the current dictionary sequence of sub-word units was generated from an audio input or a typed input and for outputting a determination result; and
        selecting, for the current dictionary sub-word sequence, the mode of operation of said sub-word unit comparator in dependence upon said determination result.

40. A method according to claim 39, wherein each dictionary sequence of sub-word units has a respective label indicating if the sequence of sub-word units was generated from an audio input or a typed input, and wherein said determining step determines if the current dictionary sequence of sub-word units was generated from an audio input or a typed input in dependence upon the respective label.

41. A method according to claim 39, wherein each of said sub-word units represents a phoneme.

42. A speech recognition method comprising:
    receiving speech signals to be recognised;
    comparing the received speech signals with stored sub-word unit models to generate one or more sequences of sub-word units representative of the received speech signals; and processing the one or more sequences of sub-word units output by said comparing step using a stored word dictionary to generate one or more words corresponding to the received speech signal, wherein said processing step comprises:
a first receiving step of receiving the recognised sequence of sub-word units representative of the received speech signals;
a second receiving step of receiving from said word dictionary a plurality of dictionary sub-word sequences, each representative of one or more known words;
comparing sub-word units of the recognised sequence with sub-word units of each received dictionary sequence to provide a set of comparison scores;
combining the comparison scores obtained by comparing the sub-word units of the recognised sequence with the sub-word units of each received dictionary sequence to provide, for each dictionary sequence, a measure of the similarity between the recognised sequence and each received dictionary sequence; and
identifying said one or more words using the similarity measures provided by the combining step, wherein said comparing step comprises:
aligning sub-word units of the recognised sequence with sub-word units of each received dictionary sequence to form a number of aligned pairs of sub-word units;
a first sub-comparing step of comparing, for each aligned pair, the recognised sequence sub-word unit in the aligned pair with each of a plurality of sub-word units taken from a set of predetermined sub-word units, to generate a corresponding plurality of intermediate comparison scores representative of the similarities between the recognised sequence sub-word unit and the respective sub-word units of the set;
a second sub-comparing step for comparing, for each aligned pair, the dictionary sequence sub-word unit in the aligned pair with each of said plurality of sub-word units from the set to generate a further corresponding plurality of intermediate comparison scores representative of the similarities between said dictionary sequence sub-word unit and the respective sub-word units of the set; and
calculating, for each aligned pair, a comparison score representative of the similarity between the sub-word units of the aligned pair by combining the pluralities of intermediate comparison scores generated by said first and second sub-comparing steps, to provide said set of comparison scores.

43. A storage medium storing processor implementable instructions for controlling a processor to implement a method of identifying one or more words corresponding to a sequence of sub-word units output by a recognition system in response to a rendition of the one or more words, the processor implementable instructions comprising:
instructions for a first receiving step of receiving the recognised sequence of sub-word units representative of the one or more words to be identified;
instructions for a second receiving step of receiving a plurality of dictionary sub-word sequences, each representative of one or more known words;
instructions for comparing sub-word units of the recognised sequence with sub-word units of each received dictionary sequence to provide a set of comparison scores;
instructions for combining the comparison scores obtained by comparing the sub-word units of the recognised sequence with the sub-word units of the same dictionary sequence to provide, for each dictionary sequence, a measure of the similarity between the recognised sequence and the dictionary sequence; and
instructions for identifying said one or more words using the similarity measures provided by the combining step, wherein said instructions for said comparing step include:
instructions for aligning sub-word units of the recognised sequence with sub-word units of the same dictionary sequence to form, for each dictionary sequence, a number of aligned pairs of sub-word units;
instructions for a first sub-comparing step of comparing, for each aligned pair, the recognised sequence sub-word unit in the aligned pair with each of a plurality of sub-word units taken from a set of predetermined sub-word units, to generate a corresponding plurality of intermediate comparison scores representative of the similarities between the recognised sequence sub-word unit and the respective sub-word units of the set;
instructions for a second sub-comparing step of comparing, for each aligned pair, the dictionary sequence sub-word unit in the aligned pair with each of said plurality of sub-word units from the set to generate a further corresponding plurality of intermediate comparison scores representative of the similarities between said dictionary sequence sub-word unit and the respective sub-word units of the set; and
instructions for calculating, for each aligned pair, a comparison score representative of the similarity between the sub-word units of the aligned pair by combining the pluralities of intermediate comparison scores generated by said first and second sub-comparing steps, to provide said set of comparison scores.

44. Processor implementable instructions for controlling a processor to implement a method of identifying one or more words corresponding to a sequence of sub-word units output by a recognition system in response to a rendition of the one or more words, the processor implementable instructions comprising:
instructions for a first receiving step of receiving the recognised sequence of sub-word units representative of the one or more words to be identified;
instructions for a second receiving step of receiving a plurality of dictionary sub-word sequences, each representative of one or more known words;
instructions for comparing sub-word units of the recognised sequence with sub-word units of each received dictionary sequence to provide a set of comparison scores;
instructions for combining the comparison scores obtained by comparing the sub-word units of the recognised sequence with the sub-word units of the same dictionary sequence to provide, for each dictionary sequence, a measure of the similarity between the recognised sequence and the dictionary sequence; and
instructions for identifying said one or more words using the similarity measures provided by the combining step, wherein said instructions for said comparing step include:
  instructions for aligning sub-word units of the recognised sequence with sub-word units of the same dictionary sequence to form, for each dictionary sequence, a number of aligned pairs of sub-word units;
  instructions for a first sub-comparing step of comparing, for each aligned pair, the recognised sequence sub-word unit in the aligned pair with each of a plurality of sub-word units taken from a set of predetermined sub-word units, to generate a corresponding plurality of intermediate comparison scores representative of the similarities between the recognised sequence sub-word unit and the respective sub-word units of the set;
  instructions for a second sub-comparing step of comparing, for each aligned pair, the dictionary sequence sub-word unit in the aligned pair with each of said plurality of sub-word units from the set to generate a further corresponding plurality of intermediate comparison scores representative of the similarities between said dictionary sequence sub-word unit and the respective sub-word units of the set; and
  instructions for calculating, for each aligned pair, a comparison score representative of the similarity between the sub-word units of the aligned pair by combining the pluralities of intermediate comparison scores generated by said first and second sub-comparing steps, to provide said set of comparison scores.

45. An apparatus for identifying one or more words corresponding to a sequence of sub-word units output by a recognition system in response to a rendition of the one or more words, the apparatus comprising:
  a first receiver operable to receive the recognised sequence of sub-word units representative of the one or more words to be identified;
  a second receiver operable to receive a plurality of dictionary sub-word sequences, each representative of one or more known words;
  a comparison score generator operable to compare sub-word units of the recognised sequence with sub-word units of each dictionary sequence to provide a set of comparison scores;
  a similarity measure generator operable to combine the comparison scores obtained by comparing the sub-word units of the recognised sequence with the sub-word units of the same dictionary sequence to provide, for each dictionary sequence, a measure of the similarity between the recognised sequence and the dictionary sequence; and
  a word identifier operable to identify said one or more words using similarity measures provided by the similarity measure generator,
  wherein said comparison score generator comprises:
    a sub-word unit aligner operable to align sub-word units of the recognised sequence with sub-word units of the same dictionary sequence to form, for each dictionary sequence, a number of aligned pairs of sub-word units;
    a first sub-comparator operable to compare, for each aligned pair, the recognised sequence sub-word unit in the aligned pair with each of a plurality of sub-word units taken from a set of predetermined sub-word units, to generate a corresponding plurality of intermediate comparison scores representative of the similarities between the recognised sequence sub-word unit and the respective sub-word units o the set;
    a second sub-comparator operable to compare, for each aligned pair, the dictionary sequence sub-word unit in the aligned pair with each of said plurality of sub-word units from the set to generate a further corresponding plurality of intermediate comparison scores representative of the similarities between said dictionary sequence sub-word unit and the respective sub-word units of the set; and
    a calculator operable to calculate, for each aligned pair, a comparison score representative of the similarity between the sub-word units of the aligned pair by combining the pluralities of intermediate comparison scores generated by said first and second sub-comparators, to provide said set of comparison scores.

46. An apparatus according to claim 45, wherein said comparison score generator is operable to compare the recognised sequence with the plurality of dictionary sequences concurrently.

47. An apparatus according to claim 45, wherein the calculator is operable to combine the intermediate comparison scores obtained by the first and second sub-comparators when comparing the recognised sequence sub-word unit and the dictionary sequence sub-word unit in an aligned pair with the same sub-word unit from the set of predetermined sub-word units, to generate a plurality of combined intermediate comparison scores and is operable to generate said comparison score for the aligned pair from the plurality of combined intermediate comparison scores generated for the aligned pair.

48. An apparatus according to claim 45, wherein said first and second sub-comparators are operable to compare the recognised sequence sub-word unit and the dictionary sequence sub-word unit respectively with each of the sub-word units in the set of sub-word units.

49. An apparatus according to claim 38, wherein said first and second sub-comparators are operable to provide intermediate comparison scores which are indicative of a probability of confusing the corresponding sub-word unit taken from said set of predetermined sub-word units as the sub-word unit in the aligned pair.

50. An apparatus according to claim 49, wherein said calculator is operable to combine the intermediate comparison scores in order to multiply the probabilities of confusing the corresponding sub-word unit taken from the set as the sub-word units in the aligned pair.

51. An apparatus according to claim 50, wherein each of said sub-word units in said set of predetermined sub-word units has a predetermined probability of occurring within a sequence of sub-word units and wherein said calculator is operable to weight each of the combined comparison scores in dependence upon the respective probability of occurrence for the sub-word unit of the set used to generate the combined comparison score.

52. An apparatus according to claim 51, wherein said calculator is operable to combine said intermediate comparison scores by calculating:

$$P(d_i^1|p_r)P(d_j^2|p_r)P(p_r)$$

where $d^1_i$ and $d^2_j$ are an aligned pair of dictionary and recognised sequence sub-word units respectively; $P(d^2_j|p_r)$ is the intermediate comparison score output by said first sub-comparator and is representative of the probability of confusing set sub-word unit $p_r$ as recognised sequence sub-word unit $d^2_j$; $P(d^1_i|p_r)$ is the intermediate comparison score output by said second sub-comparator and is representative of the probability of confusing set sub-word unit $p_r$ as dictionary sequence sub-word unit $d^1_i$; and $P(p_r)$ is a weight which represents the probability of set sub-word unit $p_r$ occurring in a sequence of sub-word units.

53. An apparatus according to claim 52, wherein the confusion probabilities for the recognised sequence sub-word units and the dictionary sequence sub-word units are determined in advance and depend upon the recognition system that was used to generate the respective sub-word unit sequences.

54. An apparatus according to claim 50, wherein said intermediate comparison scores represent log probabilities and wherein said calculator is operable to multiply said probabilities by adding the respective intermediate comparison scores.

55. An apparatus according to claim 45, wherein said comparison score generator has a plurality of different comparison modes of operation and wherein the apparatus further comprises:
 a determiner operable to determine if the current dictionary sequence of sub-word units was generated from an audio input or a typed input and to output a determination result; and
 a selector operable to select for the current dictionary sub-word sequence, the mode of operation of said comparison score generator in dependence upon said determination result.

56. An apparatus according to claim 55, wherein said comparison score generator includes a third sub-comparator operable to compare, for each aligned pair, the recognised sequence sub-word unit in the aligned pair with the dictionary sequence sub-word unit in the aligned pair by calculating:

$$P(d_i^1|d_j^2)$$

where $d^1_i$ and $d^2_j$ are an aligned pair of dictionary and recognised sequence sub-word units respectively, to provide a comparison score for the aligned pair; and
wherein said comparison score generator is operable in a first comparison mode to determine said set of comparison scores using said first and second sub-comparator, and is operable in a second comparison mode to determine said set of comparison scores using said third sub-comparator.

57. An apparatus according to claim 56, wherein the selector is operable to select said first comparison mode of said comparison score generator when said determiner determines that the current dictionary sequence of sub-word units was generated from an audio input and to select said second comparison mode of said comparison score generator when said determiner determines that the current dictionary sequence of sub-word units was generated from a typed input.

58. An apparatus according to claim 45, wherein each of the sub-word units in said dictionary and recognised sequences of sub-word units belong to said set of predetermined sub-word units and wherein said first and second sub-comparators are operable to provide said comparison scores using predetermined data which relate the sub-word units in said set to each other.

59. An apparatus according to claim 58, wherein said predetermined data comprises, for each sub-word unit in the set of sub-word units, a probability for confusing that sub-word unit with each of the other sub-word units in the set of sub-word units.

60. An apparatus according to claim 45, wherein said sub-word unit aligner comprises a dynamic programming aligner operable to align said dictionary and recognised sequences of sub-word units using a dynamic programming technique.

61. An apparatus according to claim 45, wherein each of said sub-word units represents a phoneme.

62. A speech recognition system comprising:
 a speech signal receiver operable to receive speech signals to be recognised;
 a sub-word unit model store operable to store sub-word unit models;
 a sub-word unit sequence generator operable to compare the received speech signals with the sub-word unit models to generate one or more sequences of sub-word units representative of the received speech signals;
 a word dictionary relating sequences of sub-word units to words; and
 a word decoder for processing the one or more sequences of sub-word units generated by said sub-word unit sequence generator using the word dictionary to generate one or more words corresponding to the received speech signals;
wherein said word decoder comprises:
 a first receiver operable to receive the recognised sequence of sub-word units representative of the received speech signals;
 a second receiver operable to receive from said word dictionary a plurality of dictionary sub-word sequences, each representative of one or more known words;
 a comparison score generator operable to compare sub-word units of the recognised sequence with sub-word units of each dictionary sequence to provide a set of comparison scores;
 a similarity measure generator operable to combine the comparison scores obtained by comparing the sub-word units of the recognised sequence with the sub-word units of each received dictionary sequence to provide, for each dictionary sequence, a measure of the similarity between the recognised sequence and each received dictionary sequence; and
 a word identifier operable to identify said one or more words using the similarity measures provided by the similarity measure generator; and
wherein said comparison score generator comprises:
 a sub-word unit aligner operable to align sub-word units of the recognised sequence with sub-word units of each received dictionary sequence to form a number of aligned pairs of sub-word units;
 a first sub-comparator operable to compare for each aligned pair, the recognised sequence sub-word unit in the aligned pair with each of a plurality of sub-word units taken from a set of predetermined sub-word units, to generate a corresponding plurality of intermediate comparison scores representative of the similarities between the recognised sequence sub-word unit and the respective sub-word units of the set;
 a second sub-comparator operable to compare for each aligned pair, the dictionary sequence sub-word unit in the aligned pair with each of said plurality of sub-word units from the set to generate a further corresponding plurality of intermediate comparison scores representative of the similarities between said dictionary sequence sub-word unit and the respective sub-word units of the set; and a calculator operable to calculate, for each aligned pair, a comparison score representative of the similarity between the sub-word units of the aligned pair by combining the pluralities of intermediate comparison scores generated by said first and second sub-comparators, to provide said set of comparison scores.

63. An apparatus for identifying one or more words corresponding to a sequence of sub-word units output by a recognition system in response to a rendition of the one or more words, the apparatus comprising:

a first receiver operable to receive the recognised sequence of sub-word units representative of the one or more words to be identified;

a second receiver operable to receive a plurality of dictionary sub-word sequences, each representative of one or more known words;

a comparison result generator operable to compare sub-word units of the recognised sequence with sub-word units of each dictionary sequence to provide a set of comparison results;

a similarity measure generator operable to combine the comparison results obtained by comparing the sub-word units of the recognised sequence with the sub-word units of the same dictionary sequence to provide, for each dictionary sequence, a measure of the similarity between the recognised sequence and the dictionary sequence; and a word identifier operable to identify said one or more words using the similarity measures provided by the similarity measure generator;

wherein said comparison result generator has a plurality of different comparison modes of operation and wherein the apparatus further comprises:

a determiner operable to determine if a current dictionary sequence of sub-word units was generated from an audio input or a typed input and to output a determination result; and a selector operable to select, for the current dictionary sub-word sequence, the mode of operation of said comparing means in dependence upon said determination result.

64. An apparatus according to claim 63, wherein each dictionary sequence of sub-word units has a respective label indicating if the sequence of sub-word units was generated from an audio input or a typed input, and wherein said determiner is operable to determine if the current dictionary sequence of sub-word units was generated from an audio input or a typed input in dependence upon the respective label.

65. An apparatus according to claim 63, wherein each of said sub-word units represents a phoneme.

66. A speech recognition system comprising:
means for receiving speech signals to be recognised;
means for storing sub-word unit models;
means for comparing the received speech signals with the sub-word unit models to generate one or more sequences of sub-word units representative of the received speech signals;
a word dictionary relating sequences of sub-word units to words; and
a word decoder for processing the one or more sequences of sub-word units output by said comparing means using the word dictionary to generate one or more words corresponding to the received speech signals;

wherein said word decoder comprises:
first receiving means for receiving the recognised sequence of sub-word units representative of the one or more words to be identified;
second receiving means for receiving a plurality of dictionary sub-word sequences, each representative of one or more known words;
means for comparing sub-word units of the recognised sequence with sub-word units of each dictionary sequence to provide a set of comparison results;
means for combining the comparison results obtained by comparing the sub-word units of the recognised sequence with the sub-word units of the same dictionary sequence to provide, for each dictionary sequence, a measure of the similarity between the recognised sequence and the dictionary sequence; and
means for identifying said one or more words using the similarity measures provided by the combining means;

wherein said comparing means has a plurality of different comparison modes of operation and wherein the word decoder further comprises:
means for determining if a current dictionary sequence of sub-word units was generated from an audio input or a typed input and to output a determination result; and
means for selecting, for the current dictionary sub-word sequence, the mode of operation of said comparing means in dependence upon said determination result.

67. A speech recognition system comprising:
a speech signal receiver operable to receive speech signals to be recognised;
a sub-word unit model store operable to store sub-word unit models;
a sub-word unit sequence generator operable to compare the received speech signals with the sub-word unit models to generate one or more sequences of sub-word units representative of the received speech signals;
a word dictionary relating sequences of sub-word units to words; and
a word decoder for processing the one or more sequences of sub-word units output by said sub-word unit sequence generator using the word dictionary to generate one or more words corresponding to the received speech signals;

wherein said word decoder comprises:
a first receiver operable to receive the recognised sequence of sub-word units representative of the one or more words to be identified;
a second receiver operable to receive a plurality of dictionary sub-word sequences, each representative of one or more known words;
a comparison result generator operable to compare sub-word units of the recognised sequence with sub-word units of each dictionary sequence to provide a set of comparison results;
a similarity measure generator operable to combine the comparison results obtained by comparing the sub-word units of the recognised sequence with the sub-word units of the same dictionary sequence to provide, for each dictionary sequence, a measure of the similarity between the recognised sequence and the dictionary sequence; and a word identifier operable to identify said one or more words using the similarity measures provided by the similarity measure generator;

wherein said comparison result generator has a plurality of different comparison modes of operation and wherein the word decoder further comprises:

a determiner operable to determine if a current dictionary sequence of sub-word units was generated from an audio input or a typed input and for outputting a determination result; and a selector operable to select, for the current dictionary sub-word sequence, the mode of operation of said comparing means in dependence upon said determination result.

68. A speech recognition method comprising:

receiving speech signals to be recognised;

comparing the received speech signals with stored sub-word unit models to generate one or more sequences of sub-word units representative of the received speech signals;

processing the one or more sequences of sub-word units output by said comparing means using a stored word dictionary to generate one or more words corresponding to the received speech signals;

wherein said processing step comprises:

a first receiving step of receiving the recognised sequence of sub-word units representative of the one or more words to be identified;

a second receiving step of receiving a plurality of dictionary sub-word sequences, each representative of one or more known words;

comparing, using a sub-word comparator, sub-word units of the recognised sequence with sub-word units of each dictionary sequence to provide a set of comparison results;

combining the comparison results obtained by comparing the sub-word units of the recognised sequence with the sub-word units of the same dictionary sequence to provide, for each dictionary sequence, a measure of the similarity between the recognised sequence and the dictionary sequence; and identifying said one or more words using the similarity measures provided by the combining step;

wherein said sub-word comparator has a plurality of different comparison modes of operation and wherein the processing step further comprises:

determining if a current dictionary sequence of sub-word units was generated from an audio input or a typed input and outputting a determination result; and selecting, for the current dictionary sub-word sequence, the mode of operation of said sub-word comparator in dependence upon said determination result.

69. A storage medium storing processor implementable instructions for controlling a processor to implement a method of identifying one or more words corresponding to a sequence of sub-word units output by a recognition system in response to a rendition of the one or more words, the processor implementable instructions comprising:

instructions for a first receiving step of receiving the recognised sequence of sub-word units representative of the one or more words to be identified;

instructions for a second receiving step of receiving a plurality of dictionary sub-word sequences, each representative of one or more known words;

instructions for comparing, using a sub-word comparator, sub-word units of the recognised sequence with sub-word units of each dictionary sequence to provide a set of comparison results;

instructions for combining the comparison results obtained by comparing the sub-word units of the recognised sequence with the sub-word units of the same dictionary sequence to provide, for each dictionary sequence, a measure of the similarity between the recognised sequence and the dictionary sequence; and instructions for identifying said one or more words using the similarity measures provided by the combining step;

wherein said sub-word comparator has a plurality of different comparison modes of operation and wherein said instructions for said comparing step comprise:

instructions for determining if a current dictionary sequence of sub-word units was generated from an audio input or a typed input and outputting a determination result; and instructions for selecting, for the current dictionary sub-word sequence, the mode of operation of said sub-word unit comparator in dependence upon said determination result.

70. Processor implementable instructions for controlling a processor to implement a method of identifying one or more words corresponding to a sequence of sub-word units output by a recognition system in response to a rendition of the one or more words, the processor implementable instructions comprising:

instructions for a first receiving step of receiving the recognised sequence of sub-word units representative of the one or more words to be identified;

instructions for a second receiving step of receiving a plurality of dictionary sub-word sequences, each representative of one or more known words;

instructions for comparing, using a sub-word comparator, sub-word units of the recognised sequence with sub-word units of each dictionary sequence to provide a set of comparison results;

instructions for combining the comparison results obtained by comparing the sub-word units of the recognised sequence with the sub-word units of the same dictionary sequence to provide, for each dictionary sequence, a measure of the similarity between the recognised sequence and the dictionary sequence; and instructions for identifying said one or more words using the similarity measures provided by the combining step;

wherein said sub-word comparator has a plurality of different comparison modes of operation and wherein said instructions for said comparing step comprise:

instructions for determining if a current dictionary sequence of sub-word units was generated from an audio input or a typed input and outputting a determination result; and instructions for selecting, for the current dictionary sub-word sequence, the mode of operation of said sub-word unit comparator in dependence upon said determination result.

* * * * *

UNITED STATES PATENT AND TRADEMARK OFFICE
CERTIFICATE OF CORRECTION

PATENT NO. : 6,801,891 B2
APPLICATION NO. : 09/986914
DATED : October 5, 2004
INVENTOR(S) : Philip Neil Garner et al.

It is certified that error appears in the above-identified patent and that said Letters Patent is hereby corrected as shown below:

ON COVER PAGE AT (30) FOREIGN APPLICATION PRIORITY DATA

"Nov. 20, 2000 (GB) ............................. 0028277" should read
--Nov. 20, 2000 (GB) ........................... 00228277.2--.

ON COVER PAGE AT (56) OTHER PUBLICATIONS

""Classic Maximum Entropy", John Skilling, pp. 45-52 in Maximum Entropy and Bayesian Methods, 1989." should read --"Classic Maximum Entropy", John Skilling, in Maximum Entropy and Bayesian Methods, 1989, pp. 45-52.--;
"Retrieva"" should read --Retrieval",--; and
"System"" should read --System",--.

COLUMN 3

Line 35, "thereof" should read --thereof.--.

COLUMN 5

Line 5, "phonemes) ," should read --phonemes),--; and
Line 34, "node $\phi_s$." should read --$\phi_s$--.

COLUMN 7

Line 43, "phoneme $P_r$" should read --phoneme $p_r$--;
Line 46, "phoneme $P_r$" should read --phoneme $p_r$--; and
Line 56, "$S(i+1,j+2)=S(ij) \cdot PI(d_{j+1}^2) \cdot P(d_{j+2}^2 | d_{j+1}^1)$" should read
--$S(i+1,j+2)=S(i,j) \cdot PI(d_{j+1}^2) \cdot P(d_{j+2}^2 | d_{j+1}^1)$--.

COLUMN 8

Line 18, "phone" should read --phoneme--.

COLUMN 9

Line 40, "manually.  This" should read --manually, this--.

COLUMN 10

Line 38, "Initially" should read --Initially,--.

UNITED STATES PATENT AND TRADEMARK OFFICE
CERTIFICATE OF CORRECTION

PATENT NO. : 6,801,891 B2
APPLICATION NO. : 09/986914
DATED : October 5, 2004
INVENTOR(S) : Philip Neil Garner et al.

It is certified that error appears in the above-identified patent and that said Letters Patent is hereby corrected as shown below:

COLUMN 11

Line 57, "then umber" should read --the number--; and
Line 61, "phoneme Pr" should read --phoneme $p_r$--.

COLUMN 12

Line 2, "phoneme pr." should read --phoneme $p_r$--;
Line 20, "Recognition"." should read --Recognition;--;
Line 21, "system"" should read --system,"--;
Line 27, "th is" should read --this--;
Line 47, "(i-1,j), (i+2,j()" should read --(i+1,j), (i+2,j)--; and
Line 49, "consequently," should read --Consequently,--.

COLUMN 13

Line 5, "(i+1,j)," should read --(i+1,j+l),--; and "d(i+2," should read --(i+2,--; and
Line 10, "phomeme $d^2_{j21}$" should read -- phoneme $d^2_{j2}$ --.

COLUMN 17

Line 3, "unit $P_r$" should read --unit $p_r$-- ; and
Line 21, "relate" should read --relates--.

COLUMN 18

Line 52, "determined" should read --determining--.

COLUMN 20

Line 46, "thc" should read --the--.

COLUMN 22

Line 45, "for" should be deleted.

COLUMN 23

Line 4, "signal," should read --signal;--; and
Line 22, "step," should read --step;--.

UNITED STATES PATENT AND TRADEMARK OFFICE
CERTIFICATE OF CORRECTION

PATENT NO. : 6,801,891 B2
APPLICATION NO. : 09/986914
DATED : October 5, 2004
INVENTOR(S) : Philip Neil Garner et al.

It is certified that error appears in the above-identified patent and that said Letters Patent is hereby corrected as shown below:

COLUMN 24

Line 9, "step," should read --step;--; and
Line 67, "step," should read --step;--.

COLUMN 25

Line 55, "generator," should read --generator;--.

COLUMN 26

Line 3, "o" should read --of--; and
Line 38, "claim 38," should read --claim 45,--.

COLUMN 28

Line 3, "claim 45 ," should read --claim 45,--.

Signed and Sealed this

Twenty-fourth Day of July, 2007

JON W. DUDAS
*Director of the United States Patent and Trademark Office*